US009764918B2

(12) United States Patent
Hagman et al.

(10) Patent No.: US 9,764,918 B2
(45) Date of Patent: Sep. 19, 2017

(54) APPARATUS FOR LAMINATING COMPOSITES

(71) Applicant: The Boeing Company, Chicago, IL (US)

(72) Inventors: Thomas J. Hagman, Seattle, WA (US); Gregory Lowman Branch, Camano Island, WA (US); James P. Dwyer, Seattle, WA (US); Brian Edward Hood, Seattle, WA (US); Erik Lund, Issaquah, WA (US); Wade Matthew Morris, Auburn, WA (US); Jonathan Richard Schwedhelm, Seattle, WA (US); Thomas C. Stone, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 690 days.

(21) Appl. No.: 14/258,015

(22) Filed: Apr. 22, 2014

(65) Prior Publication Data

US 2014/0305592 A1    Oct. 16, 2014

Related U.S. Application Data

(62) Division of application No. 13/198,418, filed on Aug. 4, 2011, now Pat. No. 8,808,490.

(51) Int. Cl.
*B29C 70/38* (2006.01)
*B29C 70/54* (2006.01)
(Continued)

(52) U.S. Cl.
CPC ............. *B65H 35/08* (2013.01); *B29C 70/30* (2013.01); *B29C 70/388* (2013.01);
(Continued)

(58) Field of Classification Search
CPC ..... B29C 70/34; B29C 70/222; B29C 70/386; B29L 2031/3076; B32B 38/1808;
(Continued)

(56) References Cited

U.S. PATENT DOCUMENTS 2,180,903 A    11/1939  Jensen
3,992,244 A    11/1976  Craig et al.
(Continued)

FOREIGN PATENT DOCUMENTS

CN    102015263 A    4/2011
EP    0250673 A1     1/1988
(Continued)

OTHER PUBLICATIONS

State Intellectual Property Office of PRC Notification of First Office Action and English Translation, dated Jun. 3, 2015, regarding Application No. 201280035525.8, 12 pages.
(Continued)

*Primary Examiner* — Linda L Gray
(74) *Attorney, Agent, or Firm* — Yee & Associates, P.C.

(57) ABSTRACT

Composite tape is laminated onto a substrate using a gantry to move a tape laminating head along the length of the substrate. The laminating head is mounted for movement along a beam on the gantry that extends across the width of the substrate. The direction of lamination may be altered by changing the angular orientation of the beam.

19 Claims, 30 Drawing Sheets

(51) Int. Cl.
  *B29C 70/30* (2006.01)
  *B65H 35/08* (2006.01)
  *B32B 37/18* (2006.01)
  *B32B 38/04* (2006.01)
  *B65H 35/00* (2006.01)
  *B32B 38/00* (2006.01)

(52) U.S. Cl.
  CPC ......... *B29C 70/545* (2013.01); *B65H 35/008* (2013.01); *B32B 37/18* (2013.01); *B32B 38/0004* (2013.01); *Y02T 50/433* (2013.01); *Y10T 156/108* (2015.01); *Y10T 156/1074* (2015.01); *Y10T 156/1077* (2015.01); *Y10T 156/1085* (2015.01); *Y10T 156/1092* (2015.01); *Y10T 156/1093* (2015.01); *Y10T 156/12* (2015.01); *Y10T 156/125* (2015.01); *Y10T 156/1348* (2015.01); *Y10T 156/1378* (2015.01); *Y10T 156/17* (2015.01); *Y10T 156/1788* (2015.01); *Y10T 156/1795* (2015.01)

(58) Field of Classification Search
  CPC ....... B32B 38/0004; B32B 37/18; B31D 5/00; Y10T 156/1348; Y10T 156/125; Y10T 156/1788
  See application file for complete search history.

(56) References Cited

U.S. PATENT DOCUMENTS

| | | | |
|---|---|---|---|
| 4,292,108 | A | 9/1981 | Weiss et al. |
| 4,557,783 | A | 12/1985 | Grone et al. |
| 4,699,683 | A | 10/1987 | McCowin |
| 4,877,471 | A | 10/1989 | McCowin et al. |
| 5,174,186 | A | 12/1992 | Baba et al. |
| 5,460,201 | A | 10/1995 | Borcea et al. |
| 5,700,347 | A | 12/1997 | McCowin |
| 5,960,831 | A | 10/1999 | Borcea et al. |
| 6,173,633 | B1 | 1/2001 | McLaughlin |
| 6,540,000 | B1 | 4/2003 | Darrieux et al. |
| 6,764,754 | B1 | 7/2004 | Hunter et al. |
| 6,846,378 | B2 | 1/2005 | Kuhn et al. |
| 6,860,957 | B2 | 3/2005 | Sana et al. |
| 7,063,118 | B2 | 6/2006 | Hauber et al. |
| 7,213,629 | B2 | 5/2007 | Ledet et al. |
| 7,419,031 | B2 | 9/2008 | Liguore et al. |
| 7,681,615 | B2 | 3/2010 | McCowin |
| 7,766,063 | B2 | 8/2010 | Lauder et al. |
| 2004/0026025 | A1 | 2/2004 | Sana et al. |
| 2005/0194210 | A1 | 9/2005 | Panossian |
| 2006/0118244 | A1 | 6/2006 | Zaballos et al. |
| 2006/0260751 | A1 | 11/2006 | Lauder et al. |
| 2007/0029030 | A1 | 2/2007 | McCowin |
| 2007/0069080 | A1 | 3/2007 | Rassaian et al. |
| 2007/0102239 | A1 | 5/2007 | Liguore et al. |
| 2008/0277057 | A1 | 11/2008 | Montgomery et al. |
| 2008/0282863 | A1 | 11/2008 | McCowin |
| 2009/0199948 | A1 | 8/2009 | Kisch |
| 2009/0211698 | A1 | 8/2009 | McCowin |
| 2009/0263618 | A1 | 10/2009 | McCarville et al. |
| 2010/0006205 | A1 | 1/2010 | McCowin et al. |
| 2010/0193103 | A1 | 8/2010 | McCowin |
| 2010/0224716 | A1 | 9/2010 | McCowin |
| 2010/0230043 | A1 | 9/2010 | Kisch |
| 2013/0032287 | A1 | 2/2013 | Hagman et al. |
| 2013/0118683 | A1 | 5/2013 | Nelson et al. |

FOREIGN PATENT DOCUMENTS

| | | |
|---|---|---|
| ES | 2253005 | 5/2006 |
| JP | H04122611 A | 4/1992 |
| JP | 2004017625 A | 1/2004 |
| JP | 2004181683 A | 7/2004 |
| JP | 2011518068 A | 6/2011 |
| JP | 2011177927 A | 9/2011 |

OTHER PUBLICATIONS

Canadian Intellectual Property Office Examination Search Report, dated Apr. 17, 2015, regarding Application No. 2,838,787, 3 pages.
European Patent Office Communication, dated Oct. 27, 2015, regarding Application No. EP12737662.2, 3 pages.
Canadian Office Action mailed Mar. 16, 2016, regarding application No. 2838787, 3 pages.
Notices of Reasons for Rejection and English Translation, issued Mar. 15, 2016, regarding Japanese Patent Application No. 2014-523939, 4 pages.
Office Action, dated May 12, 2016, regarding U.S. Appl. No. 14/258,019, 31 pages.
PCT SR dated Oct. 19, 2012 regarding application PCT/US2012/045369, filing date Jul. 3, 2012, applicant The Boeing Company, 11 pages.
Office Action, dated Jun. 20, 2013, regarding U.S. Appl. No. 13/198,418, 18 pages.
Office Action, dated Dec. 5, 2013, regarding U.S. Appl. No. 13/198,418, 11 pages.
Office Action, dated May 5, 2014, regarding U.S. Appl. No. 13/198,418, 5 pages.
Office Action, dated Aug. 12, 2016, regarding U.S. Appl. No. 14/258,019, 11 pages.
Notice of Allowance, dated Jan. 3, 2017, regarding U.S. Appl. No. 14/258,019, 11 pages.

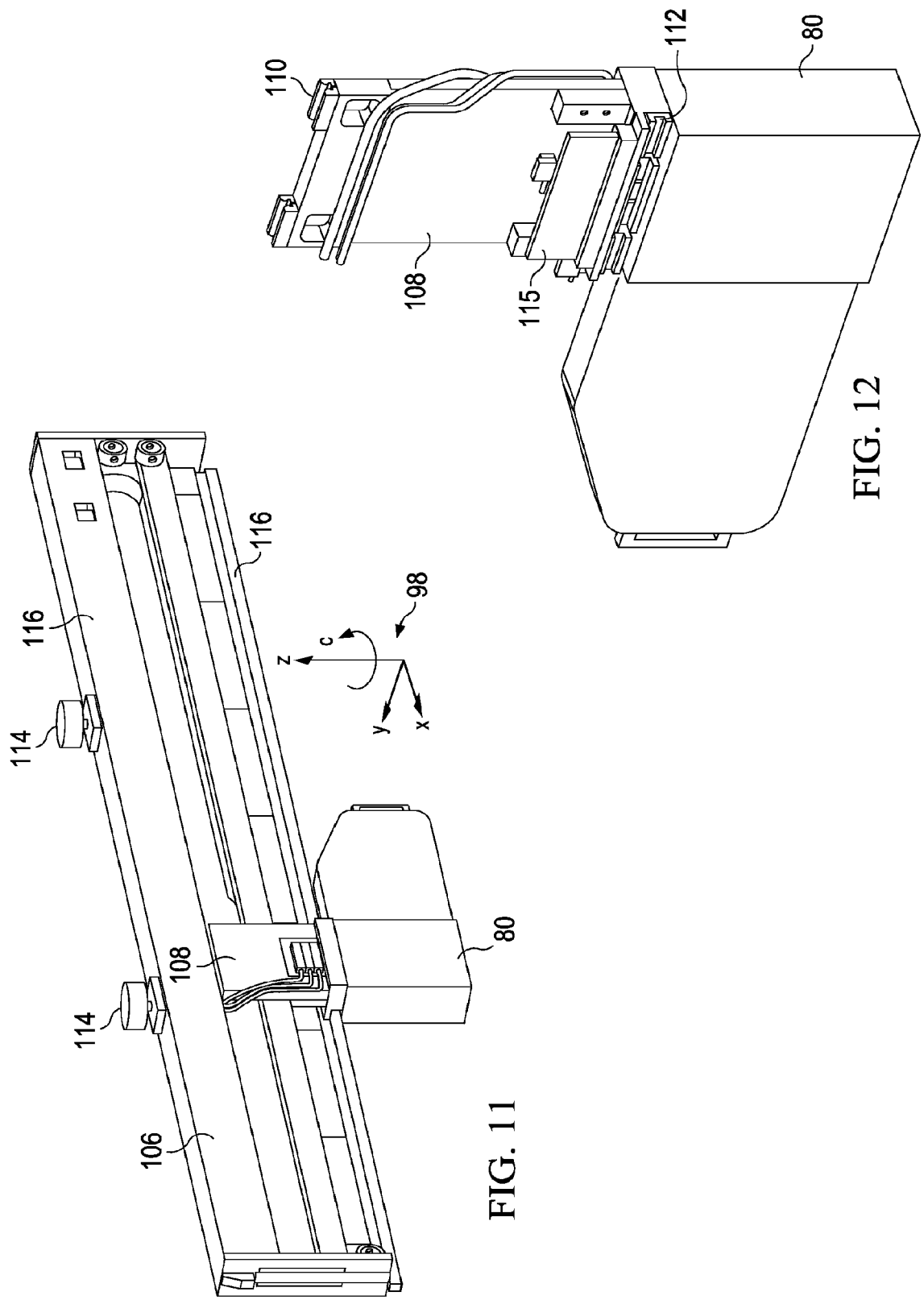

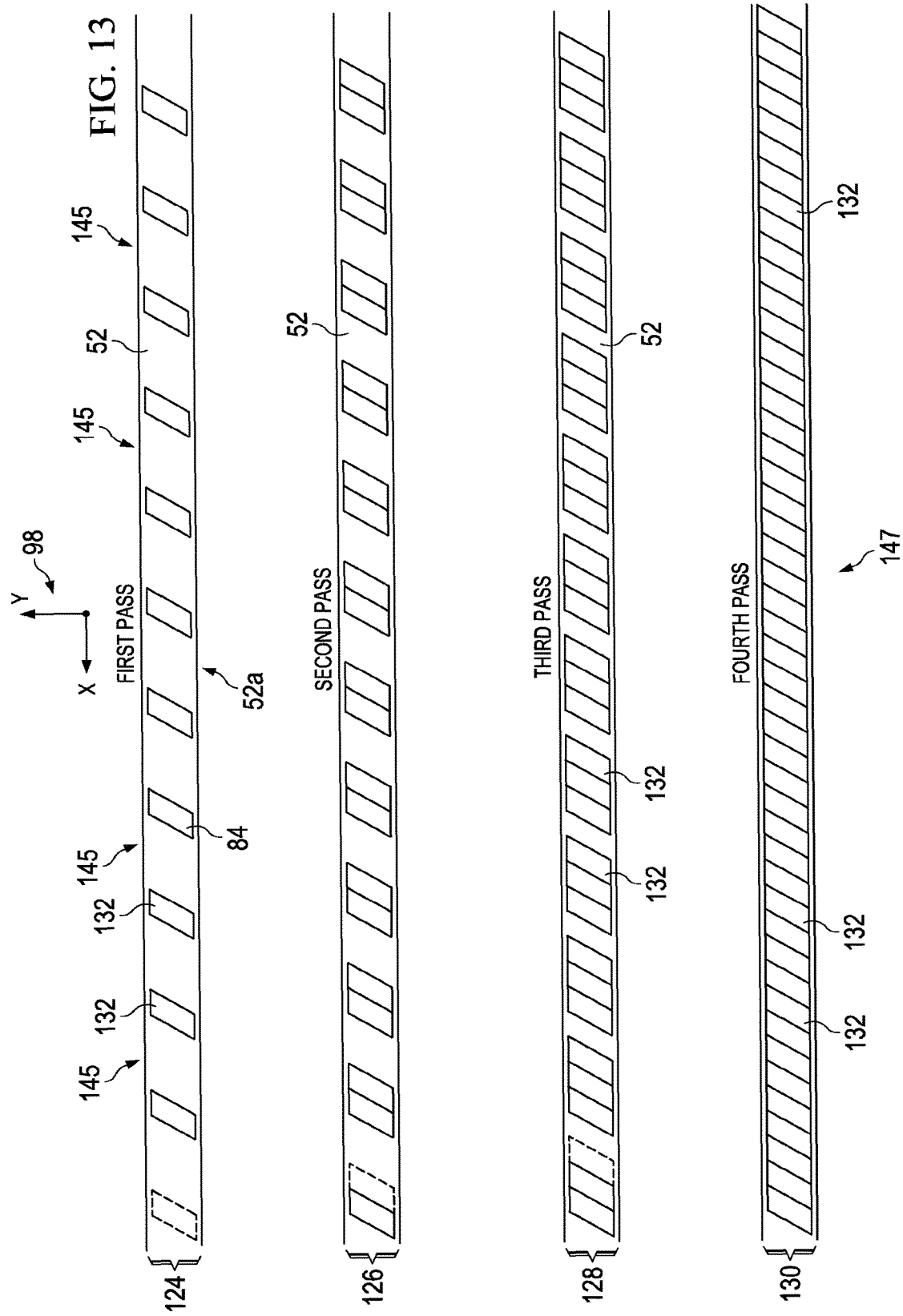

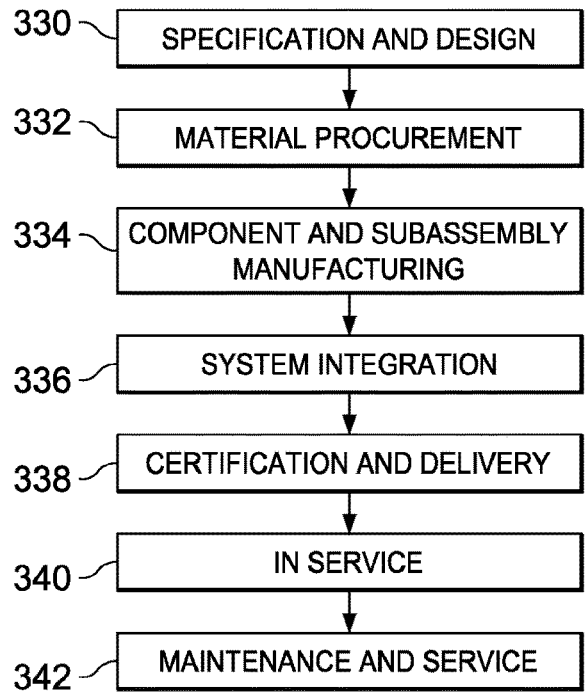
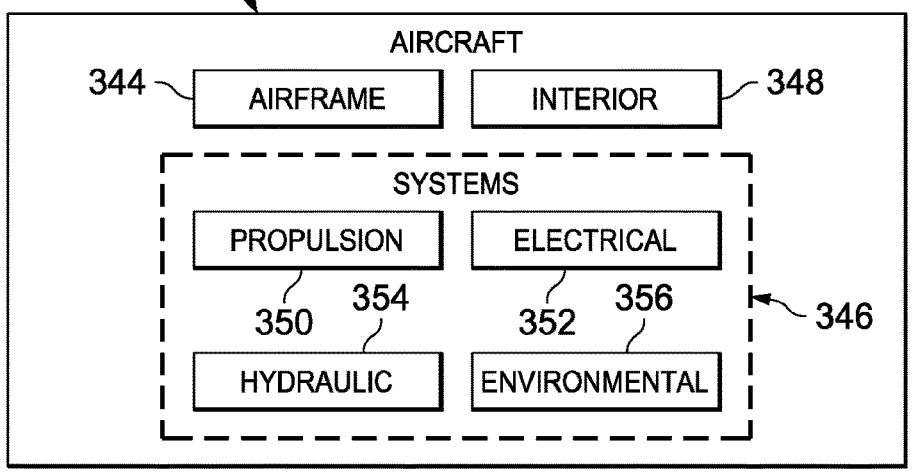

APPARATUS FOR LAMINATING COMPOSITES

This application is a divisional application of U.S. application Ser. No. 13/198,418, entitled "Method and Apparatus for Laminating Composites," filed Aug. 4, 2011.

BACKGROUND INFORMATION

1. Field

The present disclosure generally relates to fabrication of composite structures, and deals more particularly with a method and apparatus for laying up structures using automated ply lamination.

2. Background

Composite structures such as those used in the automotive, marine and aerospace industries may be fabricated using automated composite material application machines, commonly referred to as automated fiber placement (AFP) machines and composite tape layup machines (CTLMs). These machines may be used in aerospace applications, for example, to fabricate large scale structures by placing a plurality of tape strips in continuous, edge-to-edge contact forming a single wide conformal bandwidth that is compacted onto a tool.

The machines described above employ fiber placement heads that have a relatively high degree of operational flexibility, including the ability to add, drop off or cut any or all of contiguous tape strips independently of the others. However, these machines may not be well suited to laying up relatively long, narrow structures, such as spars and stringers, which require long tape courses having a zero degree fiber orientation, and many short tape courses of non-zero degree fiber orientation. For example, and without limitation, the automated machines mentioned above may have difficulty laying down the long zero degree tape courses that are not subject to wrinkling during forming, and may not be efficient in laying down the relatively short non-zero tape courses which require many rapid start-stop machine movements.

Accordingly, there is a need for a method and apparatus for automated composite tape lamination that is well suited for laying up relatively long, narrow parts which reduces or eliminates ply wrinkling, reduces material waste and increases the lay-down rate of non-zero oriented tape courses.

SUMMARY

The disclosed embodiments provide a method and apparatus for laminating up relatively long, narrow laminated structures, such as stringers and spars comprising multiple plies of differing fiber orientations formed from unidirectional composite tape. The embodiments use narrow width tape and are capable of better matching the width dimensions of long narrow parts to reduce waste. Relatively long zero degree tape courses may be laminated with improved wrinkle abatement measures, and non-zero tape courses may be efficiently laid and cut in a manner that reduces material waste while increasing the laminating rate. The apparatus features rapid guillotine type tape cutters that may be rotated to different cutting angles to make cuts that eliminate waste. Very short courses of tape can be rapidly laminated. The guillotine cutters feature a specially designed voice coil actuator to achieve rapid cutter movement. The cutter blade pivots along with movement of the tape to reduce undesirable spikes in tape tension. Laminating heads comprise multiple tape control modules that are laterally adjustable in order to adjust gaps between adjoining tape strips. Tape control modules used to laminate zero degree courses permit cuts between tape segments without significant gaps in order to form discontinuous tape courses that may reduce ply wrinkling. The laminating heads can be accurately positioned relative to each other so that the gap between tape strips can be varied, if desired.

According to one disclosed embodiment, apparatus is provided for laminating composite tape on a substrate comprising a laminator moveable relative to the substrate along a first axis. The laminator includes first and second spaced apart supports and a beam extending across the substrate along a second axis. Pivotal connections between the beam and each of the supports allow a change in the angular orientation relative to the beam relative to the first axis. The apparatus further comprises at least one tape laminating head on the beam for laminating composite tape on the substrate. The laminator may include a plurality of the beams and a tape laminating head on each of the beams. The apparatus further comprises a plurality of pivotal connections between each of the beams and the supports for allowing a change in the angular orientation of each of the beams relative to the first axis. The supports are moveable independently of each other in a direction substantially parallel to the first axis. A slideable connection between the beam and one of the supports allows the beam to slide relative to the support when the angular orientation of the beam has changed. The tape lamination head includes a plurality of carriages mounted for substantially parallel movement along the beam, and a tape control module on the each of the carriages for laying down a strip of composite tape on the substrate.

According to another embodiment, a method is provided of laminating composite tape on the substrate. The method comprises relatively moving a laminator and a substrate along an axis, and moving a tape control module along a beam on the gantry as the laminator and the substrate move relative to each other. The method further comprises using the tape control module to laminate at least one strip of composite tape on the substrate, and changing the angular orientation of the beam relative to the axis. Changing the angular orientation of the beam is performed by pivoting the beam.

According to another embodiment, a composite tape laminating head comprises a supply of composite tape and a compaction roller adapted to compact the tape onto the substrate. The head further includes a tape feed assembly for feeding tape from the tape supply to the compaction roller and a cutter assembly including a reciprocating cutter blade for cutting the tape fed to the compaction roller. The cutter assembly includes a rotor assembly for rotating the cutter blade to any of a plurality of cutting angles. The rotor assembly includes a housing and a cylinder rotatably mounted on the housing, and the cutter assembly includes a piston coupled with the cutter blade and reciprocally mounted within the cylinder.

According to another embodiment, a method is provided of laminating composite tape on a substrate comprising moving a tape laminating head across the substrate at an angle oblique to an edge of the substrate. The method further comprises cutting lengths of composite tape as the laminating head moves over the substrate, including cutting the tape substantially parallel to the substrate edge, and compacting the tape onto the substrate.

According to another embodiment, a composite tape laminating head comprises a supply of composite tape, a compaction roller adapted to compact the tape onto a substrate, and a tape feed assembly for feeding the tape from the tape supply to the compaction roller. The laminating head further comprises a tape cutting assembly for cutting the tape, including a cutting blade moveable along with the tape as the tape is being cut. The tape cutting assembly includes trunnions for pivotally mounting the blade on the head. The blade is pivotable along on an arc during the cut, and the tape cutting assembly includes an anvil against which the blade cuts the tape, wherein the anvil is pivotable along the arc with the blade.

According to still another embodiment, a method is provided of laminating composite tape on the substrate comprising moving a tape laminating head across the substrate and feeding composite tape to a compaction roller on the laminating head. The method further comprises using a cutting blade to cut lengths of the composite tape as the laminating head moves over the substrate, including moving the blade along with the tape as the blade is cutting the tape. The method also comprises compacting the tape onto the substrate. Moving the blade along with the tape includes moving the blade and the tape along an arc substantially at the same speed.

According to a further embodiment, a composite tape laminating head comprises a supply of composite tape and a compaction roller adapted to compact the tape onto a substrate. The head further includes a tape feed assembly for feeding the tape from the tape supply to the compaction roller and a tape cutting assembly for cutting the tape, including a moveable cutting blade and a moveable anvil against which the blade cuts the tape. The laminating head further comprises a drive system for moving the blade and the anvil in synchronism with each other. The blade and the anvil are each rotatable, and the drive system includes a pair of motors for respectively rotating the blade and the anvil at substantially the same rotational speed.

According to a further embodiment, a method is provided of laminating composite tape on a substrate, comprising moving a tape laminating head over the substrate and feeding composite tape to a compaction roller on the lamination head. The method further comprises rotating a cutting blade and an anvil at substantially the same rotational speed, using the cutting blade and the anvil to cut the tape, and compacting the tape onto the substrate. Rotating the blade and the anvil includes using separate motors to rotate the blade and the anvil and synchronizing the speed of the motors. Cutting the tape includes feeding the tape to a nip between the rotating blade and the rotating anvil.

According to a further embodiment, apparatus is provided for laminating composite tape on a substrate having a length and width. The apparatus comprises at least a first laminator moveable along the length of the substrate. The first laminator includes a pair of moveable supports and a beam extending across the width of the substrate and coupled with each of the supports. The apparatus also comprises a first laminating head mounted on and moveable along the beam for laminating composite tape across the width of the substrate. The first laminating head includes a supply of composite tape, a compaction roller for compacting the tape onto the substrate, a tape feed assembly for feeding tape from the tape supply to the compaction roller and a tape cutting assembly for cutting lengths of the tape fed to the compaction roller. The tape cutting assembly includes a cutting blade mounted for movement along with the tape and rotatable to any of a plurality of cutting angle positions.

According to still another embodiment, a method is provided of laminating composite tape on a substrate having a length and a width, comprising relatively moving a first laminator and the substrate along the length of the substrate and using a first tape laminating head on the first laminator to laminate tape across the width of the substrate. The method further comprises relatively moving a second laminator and the substrate along the length of the substrate, and using a second tape laminating head on the second laminator to laminate tape along the length of the substrate.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 11 is an illustration of a perspective view of one of the tape control modules and associated carriage guide rail forming part of the gang beam shown in FIGS. 9 and 10;

FIG. 12 is an illustration of a perspective view of the tape control module and associated carriage shown in FIG. 11;

FIG. 13 is an illustration showing tape courses laid by successive passes of the non-zero laminator to form a 45 degree ply;

FIG. 40 is an illustration of a flow diagram of aircraft production and service methodology.

FIG. 41 is an illustration of a block diagram of an aircraft.

DETAILED DESCRIPTION

Figure 1:
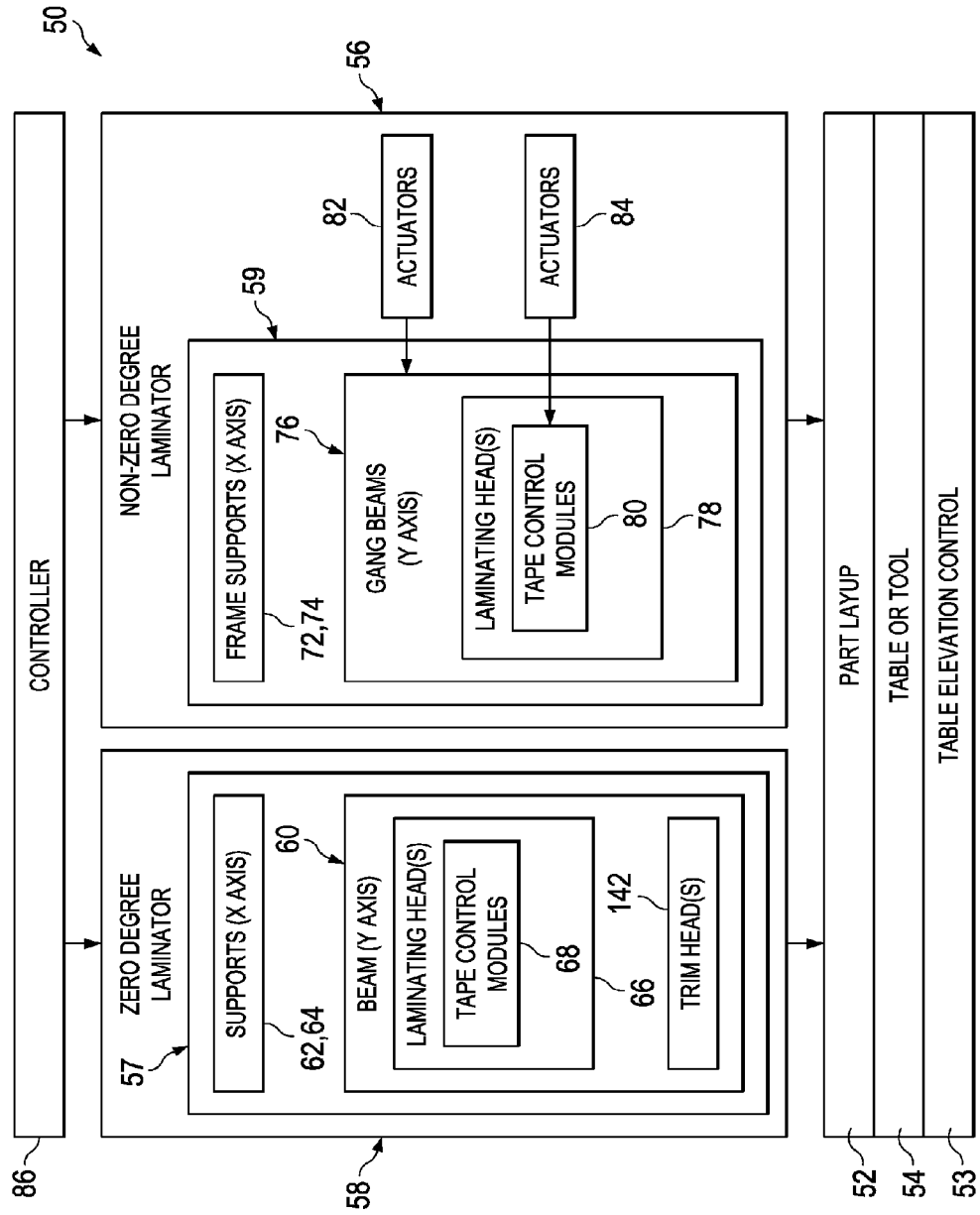
FIG. 1 is an illustration of a functional block diagram of apparatus for laminating composite materials.

Referring first to FIG. 1, laminating apparatus 50 for laying up a composite part 52 on a substrate which may comprise table 54 or tool, broadly comprises first and second laminators 56, 58 each automatically operated by a controller 86 which may comprise a PC, PLC (programmable logic controller) or other electronic controller. The table or substrate 54 and the laminators 56, 58 are relatively movable; in the illustrated embodiment, the laminators 56, 58 are independently movable relative to the table 54, however, in other embodiments, this relative movement may be achieved by moving the table 54 relative to the laminators 56, 58. The table 54 may include a table elevation control 53 for controlling the elevation of the table 54, and thus of the vertical distance between the part layup 52 and the laminators 56, 58. The part layup 52 may comprise multiple plies (not shown) of laminated composite tape, wherein each of the plies is formed by laminating multiple courses of unidirectional tape either on the table 54, or a previously laid ply of the part layup 52. The plies of the part layup 52 may have fiber orientations based on a predetermined ply schedule. As will be discussed below in more detail, the laminating apparatus 50 is particularly well suited for laying up relatively long and narrow parts such as stringers and spars (not shown) used in the aerospace industry.

The second laminator 58, sometimes hereinafter referred to as a zero degree laminator 58, is adapted to simultaneously laminate multiple courses (not shown in FIG. 1) of unidirectional composite tape generally in a zero degree orientation. In the case of relatively long, narrow part layups 52, the zero degree orientation extends along the length of the part layup 52. Laminator includes a gantry 57 comprising a cross beam 60 extending across the table 54 and supported at its opposite ends by supports 62, 64. One or more tape laminating heads 66 are mounted for movement along the beam 60. Each of the laminating heads 66 may include one or more tape control modules 68 which function to cut, add and compact lengths of composite tape (not shown in FIG. 1) onto the part layup 52.

The first laminator 56, sometimes hereinafter referred to as a non-zero laminator 56, laminates unidirectional composite tape along orientations other than zero degree orientations. For example, and without limitation, the first laminator 56 may laminate unidirectional composite tape oriented at 45, 90 or 135 degrees relative to a reference direction, such as the longitudinal axis (the X axis in FIG. 3) of the part layup 52. Other angular orientations of the lamination direction are also possible. The non-zero laminator 56 includes a gantry 59 comprising a gang of substantially parallel beams 76 supported by a pair of support frames 72, 74. The support frames 72, 74 are mounted on rails 107 (FIGS. 3 and 6) on the table 54 for movement along the length of the table 54. Each of the beams 76 includes one or more laminating heads 78. Each of the laminating heads 78 includes one or more tape control modules 80 which function to cut, add and compact unidirectional composite tape onto the part layup 52, as the laminating heads 78 travel along the beams 76. A first set of actuators 82 may be provided for adjusting the spacing between the beams 76, and a second set of actuators 84 may be provided for adjusting the spacing between adjacent ones of the tape control modules 80 on each of the laminating heads 78.

Figure 2:
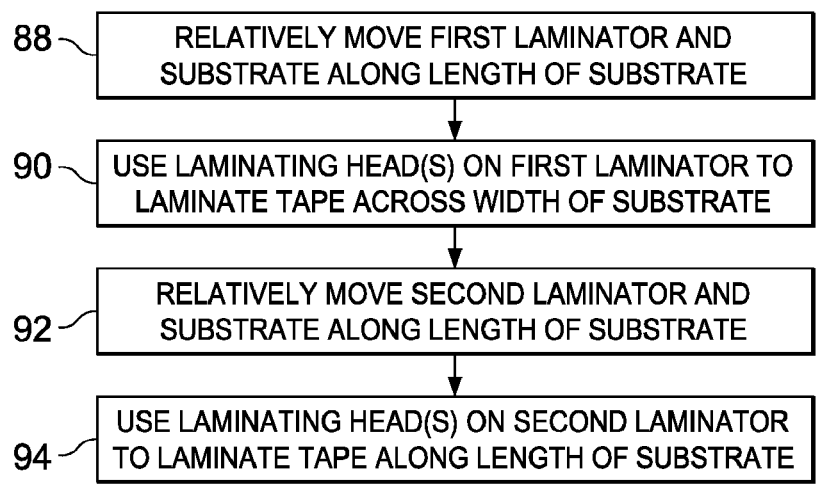
FIG. 2 is an illustration of a flow diagram of a method for laminating composite materials.

FIG. 2 illustrates a method of laminating composite parts using the laminating apparatus 50 shown in FIG. 1. Beginning at 88, the first, non-zero degree laminator 56 and the substrate 54 are moved relative to each other. As previously noted, the substrate may comprise a table 54, a tool, or a previously laid ply forming part of the ply layup 52. At step 90, one or more of the laminating heads 78 on the non-zero degree laminator 56 is used to laminate composite tape across the width (the Y-axis 98 in FIG. 3) of the substrate 54, at desired, non-zero angles relative to the length (X-axis 98) of the substrate 54. At step 92, the zero degree laminator 58 and the substrate 54 are moved relative to each other axially along the length (X-axis 98) of the substrate 52, 54. At step 94, one or more of the laminating heads 66 on the zero degree laminator 58 is used to laminate unidirectional composite tape along the length of the substrate 54. Steps 88-94 may be repeated to apply a plurality of courses of composite tape forming multiple plies of the part layup 52. In the illustrated example, the substrate 54 is fixed and the laminators 56, 58 are movable relative to the substrate 54, however in other embodiments, it may be possible to move the substrate 54 relative to the laminators 56, 58.

Figure 3:
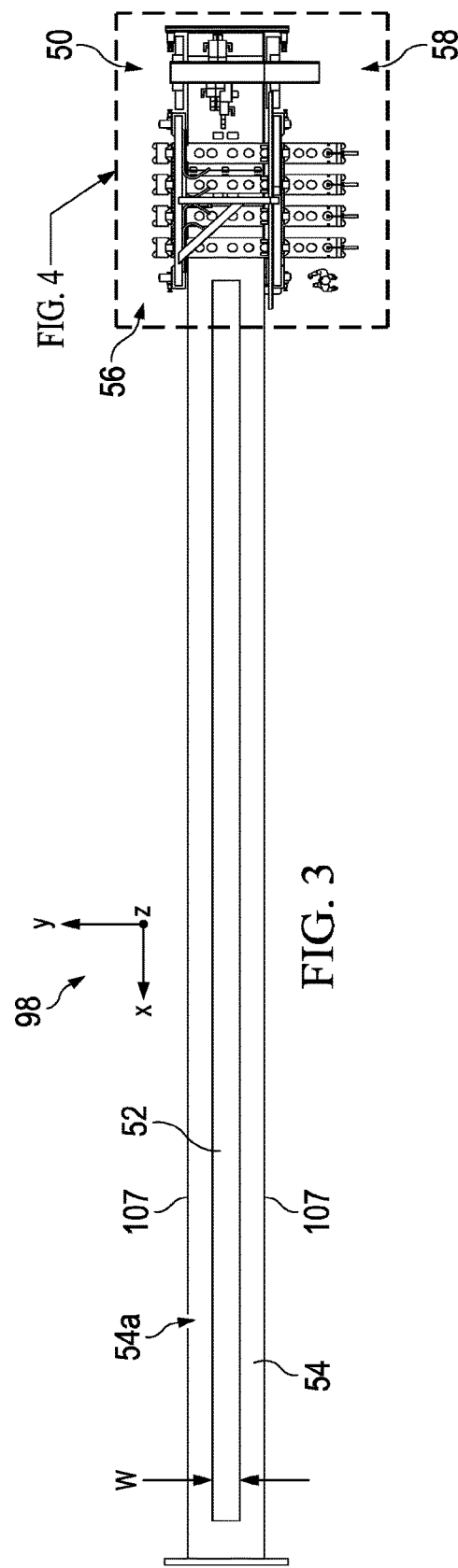
FIG. 3 is an illustration of a plan view of one embodiment of the apparatus shown in FIG. 1.
Figure 4:
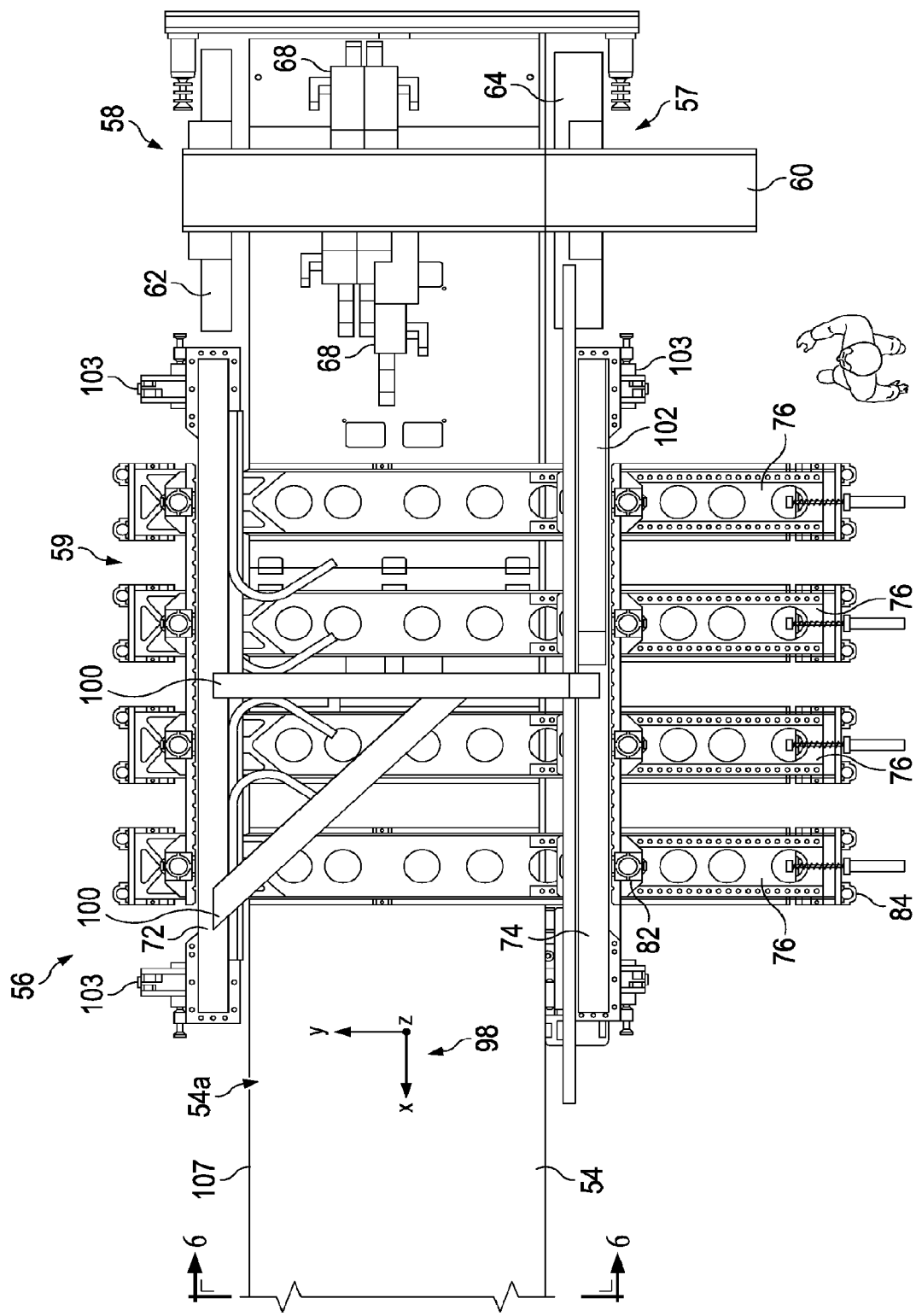
FIG. 4 is an illustration of a plan view of the area designated as "FIG. 4" in FIG. 3.

FIGS. 3 and 4 illustrate one typical embodiment of the laminating apparatus 50. The laminating apparatus operates in a three dimensional X, Y, Z coordinate system 98 in which the X-axis corresponds to the length of the part layup 52, the Y-axis 98 corresponds to the width "W" of the part layup 52, and the Z-axis 98 extends substantially normal to the X-Y plane. The laminators 56, 58 respectively are aligned with each other and move independently on rails 107 on the table 54 along the length of the table 54 (X-axis 98) to layup the plies of the part layup 52 on the table surface 54a. As previously mentioned, the part layup 52 may be relatively long in relation to its width "W" and may comprise a composite part such as spar or a stringer used in aerospace or other applications. In the illustrated example, the table surface 54a is substantially flat, but in other embodiments, the surface 54a may be a tool (not shown) having some degree of curvature or contours.

The table surface 54a may incorporate resistance heating elements (not shown) in order to heat the part layup 52 and thereby increase lamination rates. The table 54 may be removable and/or portable to allow transport of completed part layups 52 off-line in order to increase machine utilization. The table 54 may be displaced vertically along the Z-axis 98 by motors (not shown) operated by controller 86. The adjustability of table position along the Z-axis 98 using the table elevation control 53 (FIG. 1) allows changes to be made in the distance between the table surface 54a (FIG. 1)/part layup 52 and the laminating heads 66, 78. This permits compensation to be made for increases in laminate part thickness as additional plies are placed, while keeping the compaction stroke relatively short, and allowing quick exchange of the table top surface 54a.

The gantry 57 forming part of the zero degree laminator 58 comprises a traversely extending beam 60 that is pivotally connected at its opposite ends to a pair of supports 62, 64 which are independently movable substantially parallel to the X-axis 98. The supports 62, 64 may be mounted on rails 107_on the table 54 for movement along the X-axis 98. One or more laminating heads 66 are mounted for movement along the beam 60, traversely across the width of the table 54.

The gantry 59 forming part of the non-zero degree laminator 56 comprises a plurality of substantially parallel beams 76, each of which is supported on and pivotally coupled at its opposite ends with a pair of laterally spaced frame supports 72, 74. The frame supports 72, 74 are driven along rails 107 (see FIGS. 3 and 6) by gantry drive motors 103 which move the gantry 59 along the length of the table 54. Alternatively, the gantry 59 may be supported on wheels (not shown) or other structures for guiding the movement of the gantry 59 along the length of the table 54. A pair of cantilevered arms 100 support flexible control cables 102 which couple the controller 86 (FIG. 1) with actuators 82, 84, tape control modules 80 and other controlled elements forming part of the laminator 58.

Figure 5:
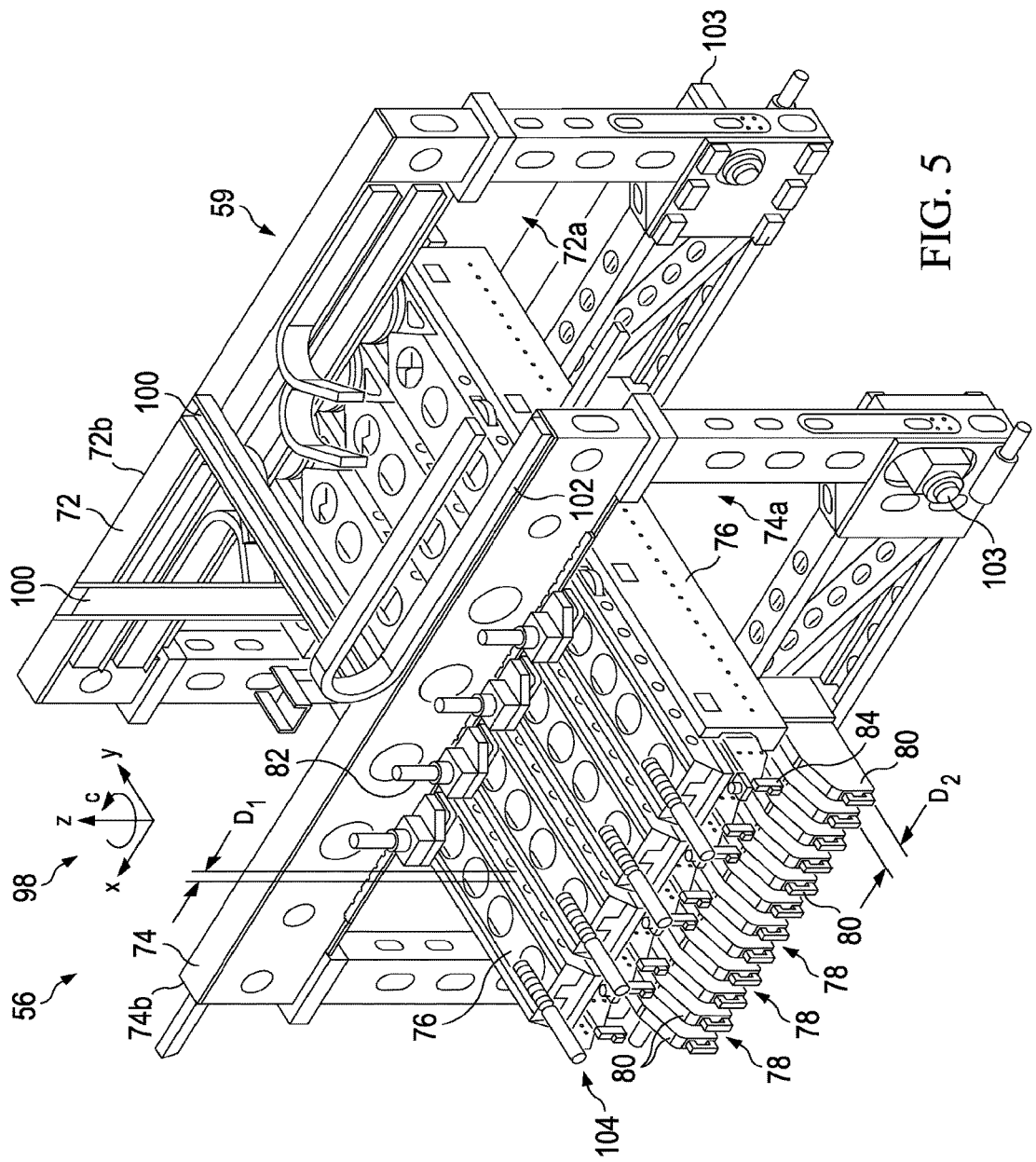
FIG. 5 is an illustration of an isometric view of the non-zero degree laminator used to layup non-zero plies forming part of the apparatus shown in FIGS. 3 and 4.
Figure 6:
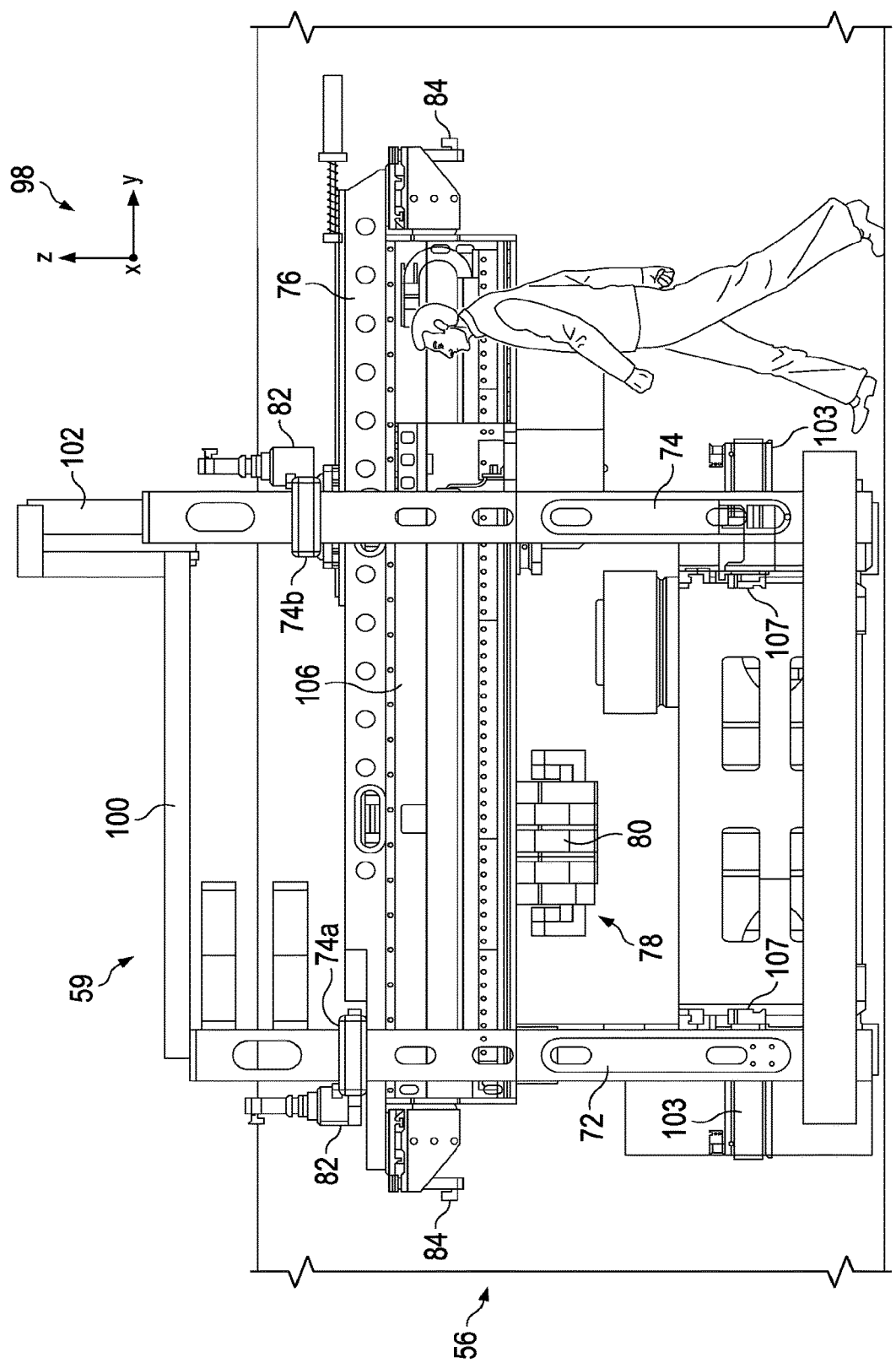
FIG. 6 is an illustration of an end view taken in the direction designated as "FIG. 6" in FIG. 4.

FIGS. 5 and 6 illustrate additional details of the non-zero degree laminator 56. Each of the frame supports 72, 74 of the gantry 59 is generally rectangular and includes open sides 72a, 74a through which one end 104 each of the beams 76 may pass. Each of the beams 76 is suspended from a horizontal frame member 72b, 74b forming part of the frame supports 72, 74. Actuators 82 are coupled between the beams 76 and the frame members 74b and function to adjust the pitch or spacing "D" between the beams 76. In the illustrated embodiment, each of the beams 76 includes a laminating head 78 comprising a gang of three tape control modules 80. However, more or less than three tape control modules 80 may be employed. Also, while four beams 76 have been illustrated, more or less than four beams may be employed. In the exemplary embodiment, the laminator 56 may simultaneously laminate up to 12 courses of tape with each pass of the four ganged laminating heads 78 over the substrate 54.

Each of the laminating heads 78 includes an actuator 84 which controls the pitch or distance "$D_2$" between adjacent tape control modules 80 on the beam 76. In FIGS. 3-6, gantry 59 is illustrated in its 90 degree orientation in which the beams 76 are aligned substantially parallel to the Y-axis and the tape control modules 80 traverse along the beams 76 to lay down unidirectional tape that has a substantially 90 degree fiber orientation. In this configuration, the frame supports 72, 74 are substantially aligned with each other in the direction of travel along the X-axis 98.

Figure 7:
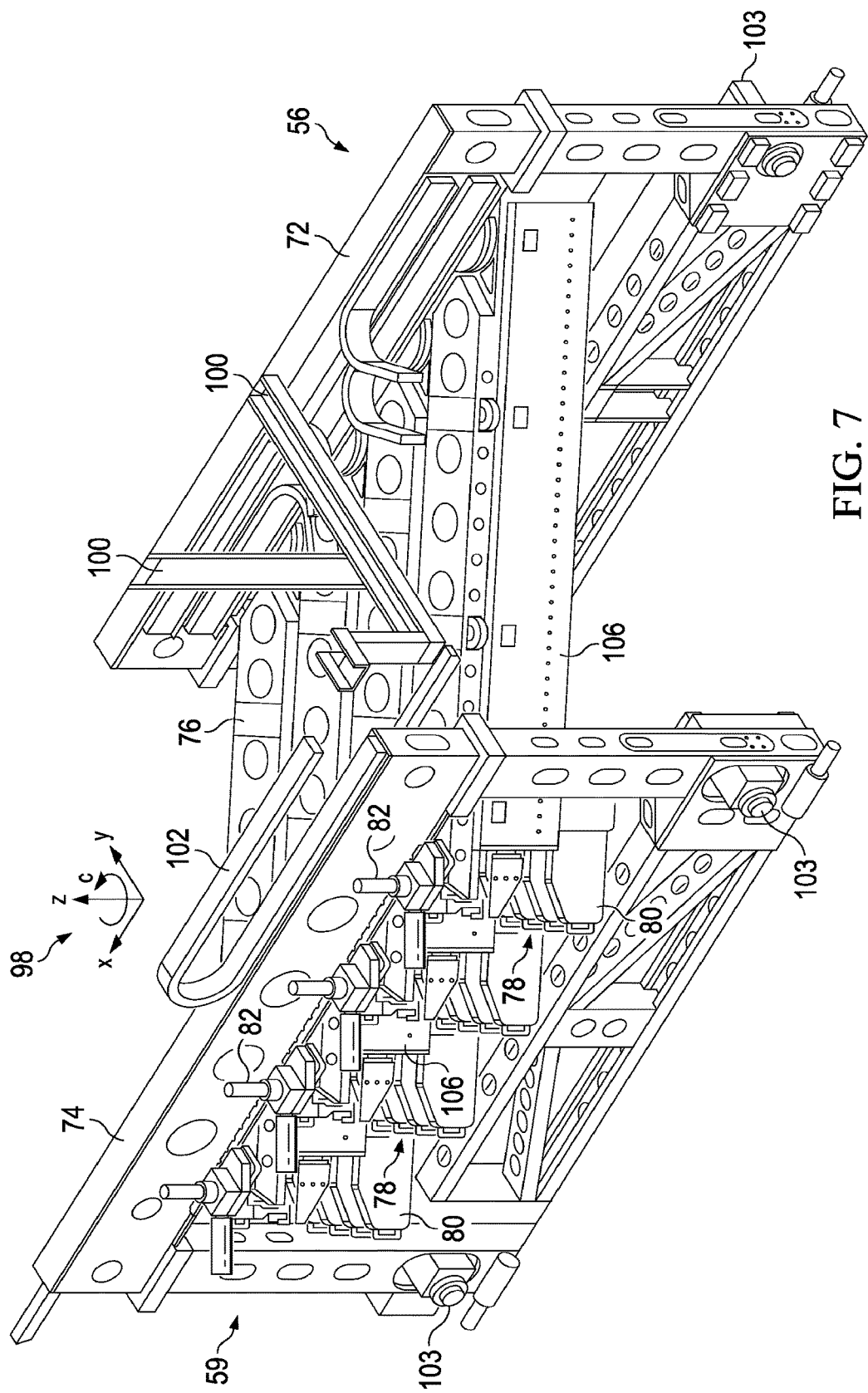
FIG. 7 is an illustration similar to FIG. 5 but showing the non-zero degree laminator reoriented to lay down 45 degree tape courses.
Figure 8:
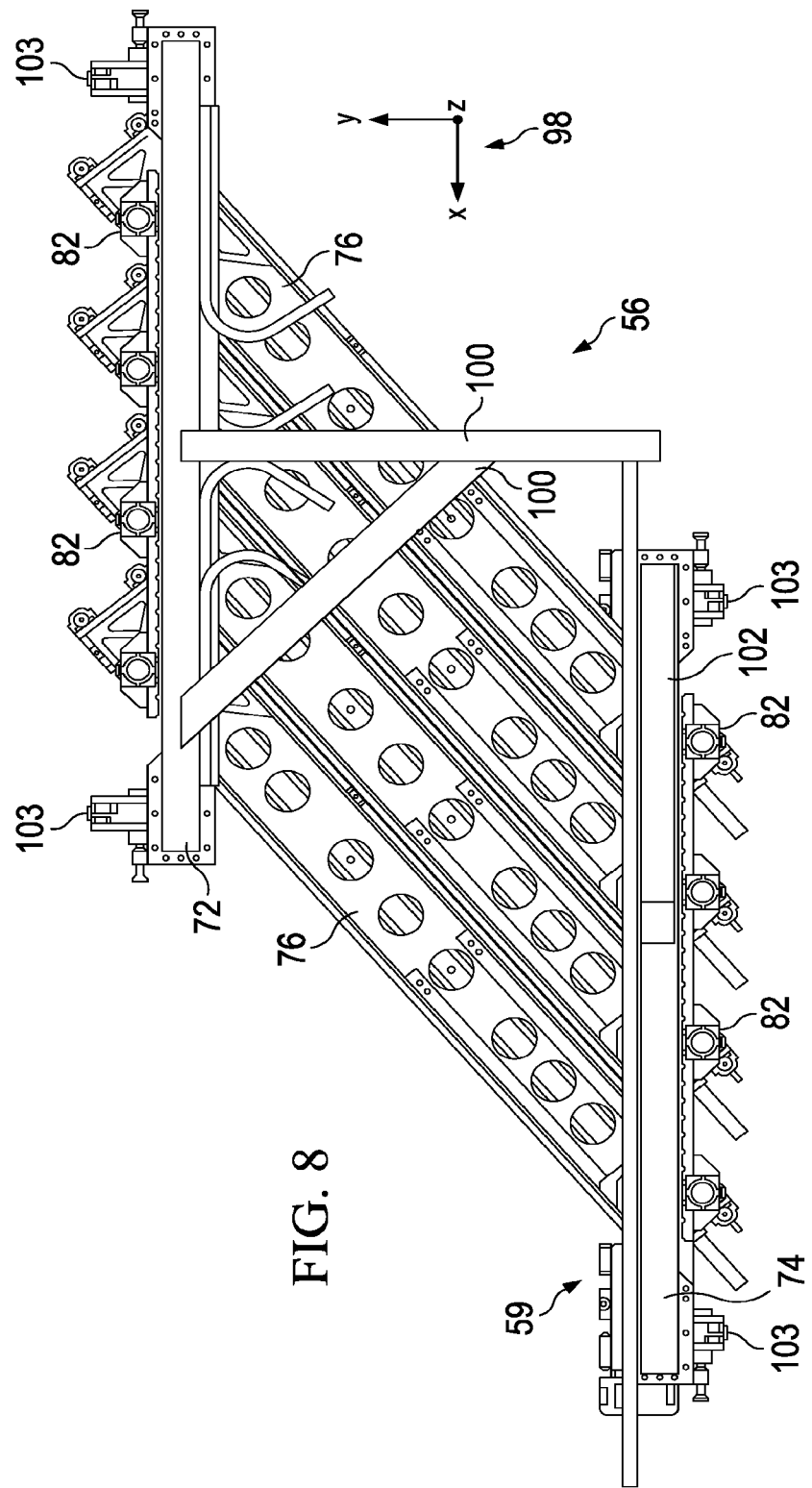
FIG. 8 is an illustration of a plan view of the laminator shown in FIG. 7.

The frame supports 72, 74 are independently moveable relative to each other, parallel to the X-axis 98, in order to change the angular orientation of each of the beams 76 which are pivotally mounted on the frame supports 72, 74. Common angular orientations of the beams 76 are 45, 90 and 135 degrees, however, other angular orientations are possible. FIGS. 7 and 8 illustrate the frame supports 72, 74 having been shifted along the X-axis 98 relative to each other in order to orient the beams 76 at a 45 degree angle relative to the X-axis 98. The change in the angular orientation of the beams 76, and thus in the direction of travel of the laminating heads 78 along the beams 76, may be altered by sending control signals to the drive motors 103 which cause at least one of the support frames 72, 74 to be displaced parallel to the X-axis 98 relative to the other support frame 72, 74. As the support frames 72, 74 are displaced relative to each other, the beams 76 pivot about axes parallel to the Z-axis 98 to the desired angular orientation. When the beams 76 are pivoted to the desired lamination angle, the alignment of the tape control module 80 relative to each other along the X-axis may be adjusted such that the modules 80 may simultaneously begin laying down tape at an edge of the substrate 54. In the illustrated example, with the beams having been pivoted to a 45 degree orientation relative to the X-axis 98, the laminating heads 78 simultaneously lay down multiple courses of tape having a 45 degree angle orientation. After a set of tape courses is laid down, the gantry 59 is incrementally advanced along the X-axis 98 to the next index position where the next set of non-zero tape courses is laid down by the laminating heads 78. Because the beams 76 can be pivoted to a desired angle, and the tape control modules can be re-aligned relative to each other to simultaneously begin laminating a non-zero degree ply, a wide swath of tape courses may be laid down without over-travel of the modules 80, resulting in a high lamination rate. As previously mentioned, the table 54 may be incrementally displaced along the Z-axis 98 by motors (not shown) operated by controller 86 to compensate for the thickness of each just-laid ply, thereby keeping the compaction stroke relatively short.

Figure 9:
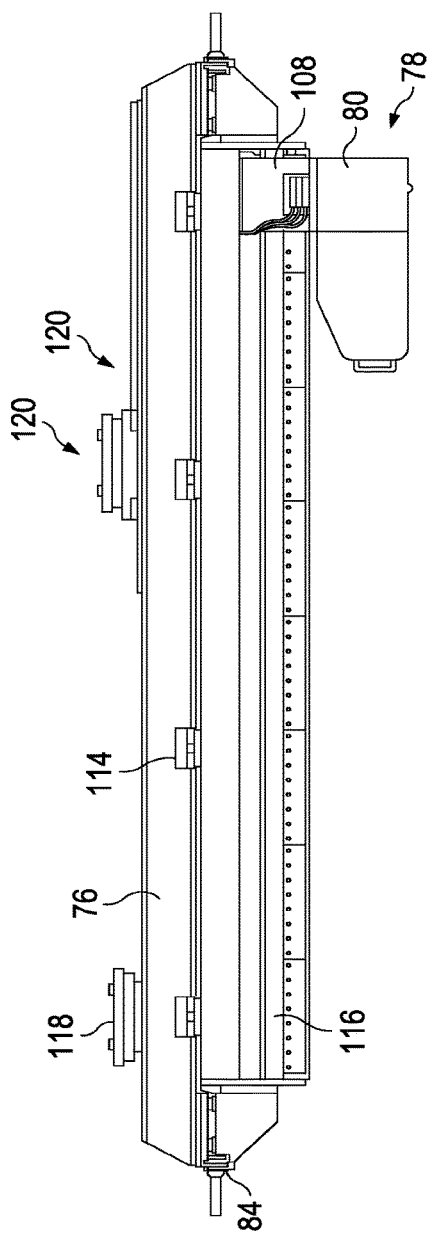
FIG. 9 is an illustration of a side view of one of the gang beams forming part of the non-zero degree laminator shown in FIG. 5-8.
Figure 10:
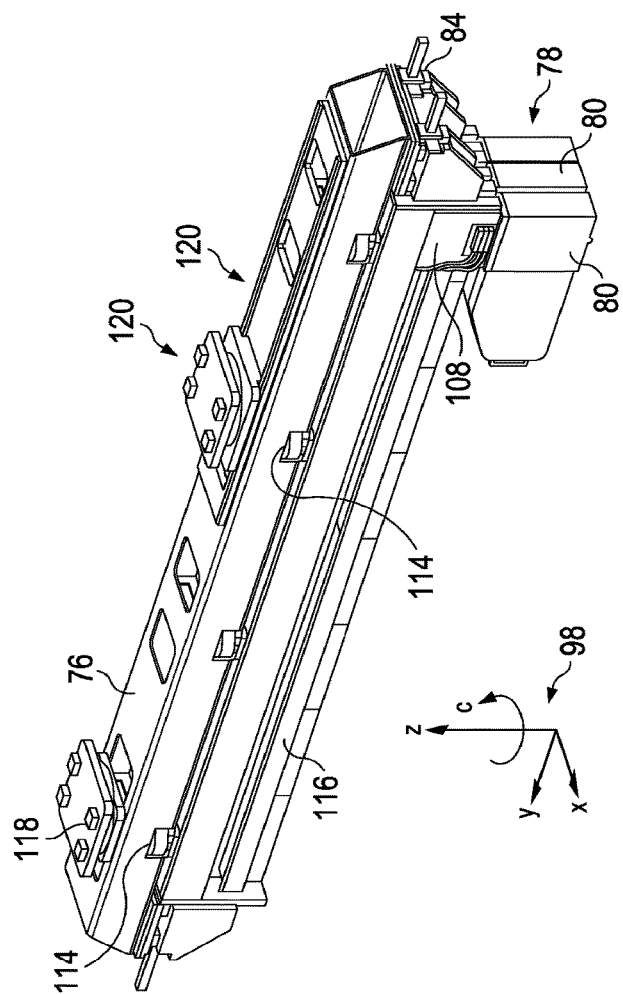
FIG. 10 is an illustration of a perspective view of the gang beam shown in FIG. 9.

FIGS. 9 and 10 illustrate additional details of one of the beams 76 and the associated laminating head 78. Each of the beams 76 includes a pivot bearing 118 on one end thereof, and a pivotal and slide bearing 120 spaced from the pivot bearing 118. The pivot bearing 118 pivotally couples the beam 76 to one of the frame supports 72 and the pivot and slide bearing 120 couples the beam 76 to the other frame support 74 for both pivotal movement and linear sliding motion as the beam 76 changes its angular orientation. As previously stated, the laminating head 78 comprises a gang of three tape control modules 80, however more or less than three tape control modules 80 are possible. In the illustrated example, each of the laminating heads 78 laminates three substantially parallel strips of unidirectional composite tape on the substrate 54. Referring also now to FIGS. 11 and 12, each of the tape control modules 80 is secured to a carriage 108 having linear rail running blocks 110, 112 that slide along linear rails 116 of a support 106. The carriages 108 are driven along the rails 116 by linear servo motors 115 mounted on the carriages 108. Each of the supports 106 is mounted by lock-down actuators 114 on one of the beams 76.

FIG. 13 illustrates lamination of a relatively narrow ply 147 having a 45 degree fiber orientation on a substrate 52 using the non-zero degree laminator 58. The ply 147 is formed by multiple passes of the four laminating heads 78 on the beams 76 over the substrate 52. During a first pass 124 of the laminating heads 78, twelve 45 degree tape strips 132 are laid down by the twelve tape control modules 80 on the four beams 76, in spaced apart relationship to each other, as shown by the arrows 145. After the first pass 124, the gantry 59 is moved an incremental distance along the X-axis 98, and the laminating heads 78 lay down a second set of 45 degree tape strips in a second pass 126. This laydown process is repeated during a third pass 128 and a fourth pass 130 until the tape strips 132 form a substantially continuous ply 147. After each ply 147 is formed, the table 54 (FIG. 4) may be incrementally displaced downwardly along the Z-axis 98 by the table elevation control 53 to compensate for the additional laminate thickness added by the ply 147.

Figure 14:
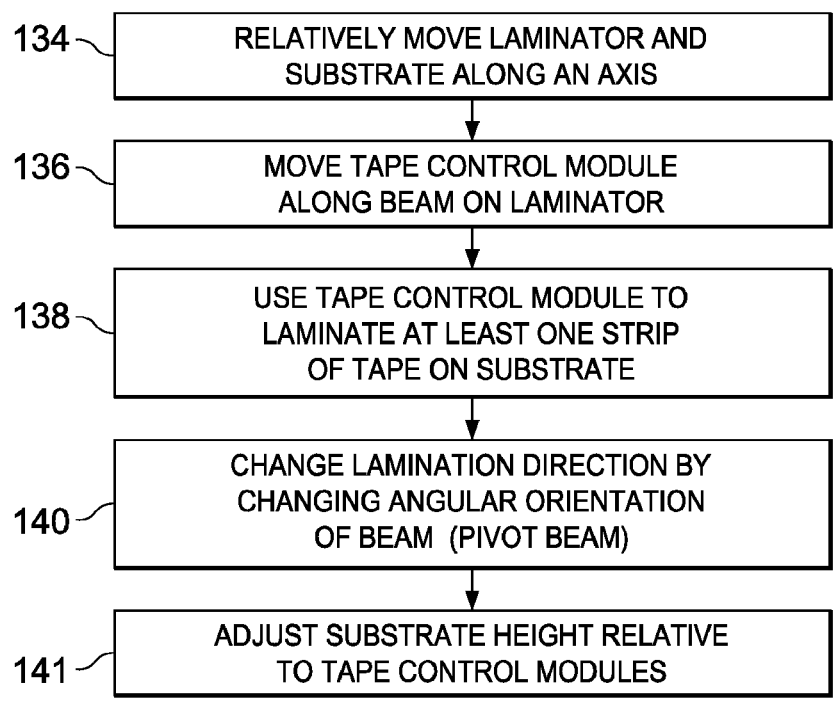
FIG. 14 is an illustration of a flow diagram of a method of laminating composites using the non-zero degree laminator shown in FIGS. 5-8.

FIG. 14 illustrates the overall steps of a method of laminating composite tape on a substrate 52 or 54 using the laminator 56 shown in FIGS. 5-8. Beginning at 134, the laminator 56 and the substrate 52/54 are moved relative to each other along an axis 98 which, in the illustrated example, is the X-axis 98. At 136, one or more tape control modules 80 are moved along a beam 76 on the laminator 56, and at 138, the tape control module 80 is used to laminate at least one strip of tape on the substrate 52/54. At 140, the lamination direction is changed by changing the angular orientation of the beam relative to the X-axis 98, by pivoting the beam 76 about a Z-axis 98. After each ply has been laminated onto the substrate 52/54 in steps 134-140, the height of the substrate 52/54 relative to the tape control modules 80, and thus the distance between them, may be adjusted along the Z-axis 98 to compensate for the thickness of the just-laid ply. This adjustment may be performed by adjusting the elevation of the table 54 shown in FIGS. 3 and 4.

Figure 15:
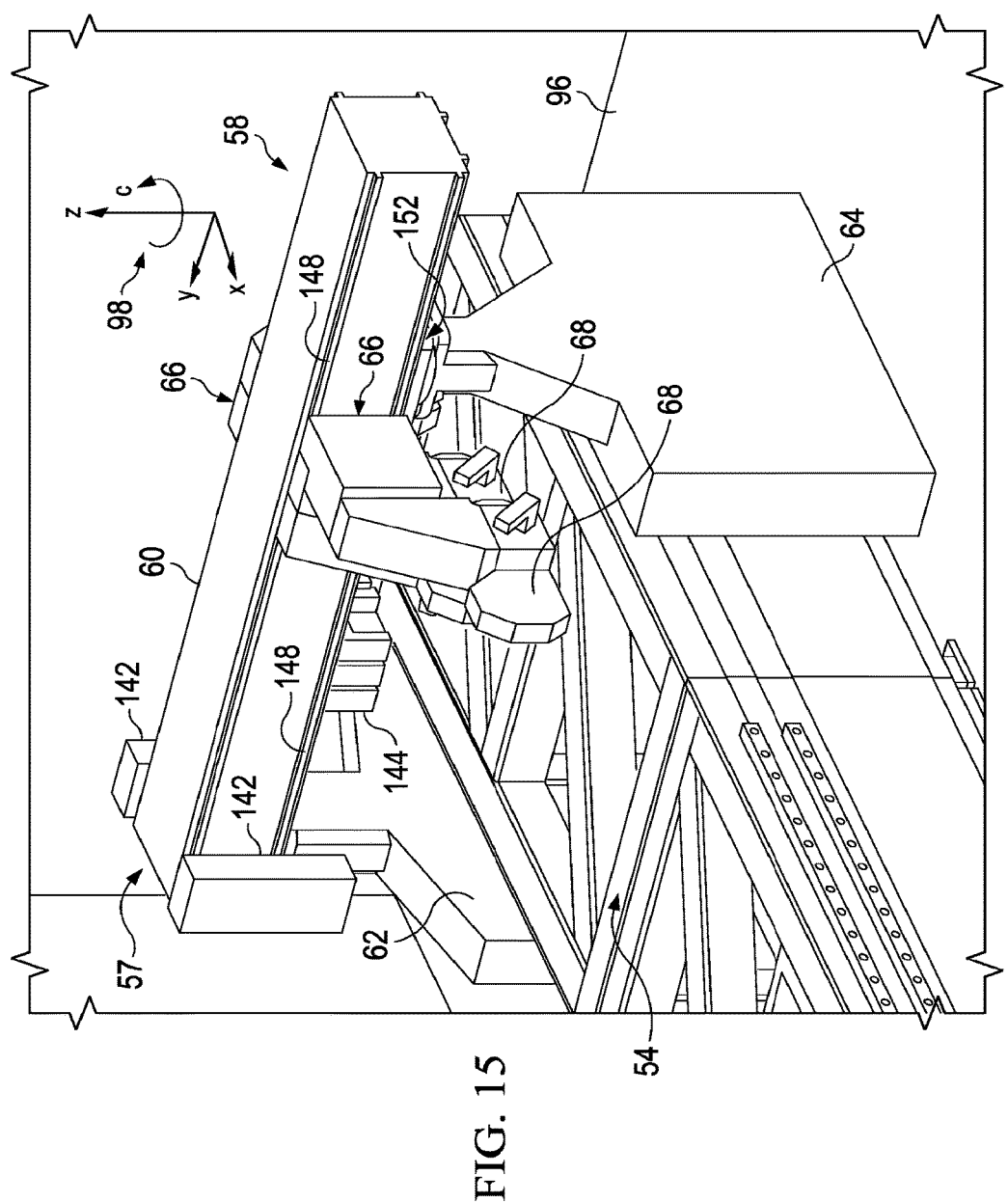
FIG. 15 is an illustration of a isometric view of the zero degree laminator shown in FIGS. 1 and 2 for laying up substantially zero degree plies.
Figure 16:
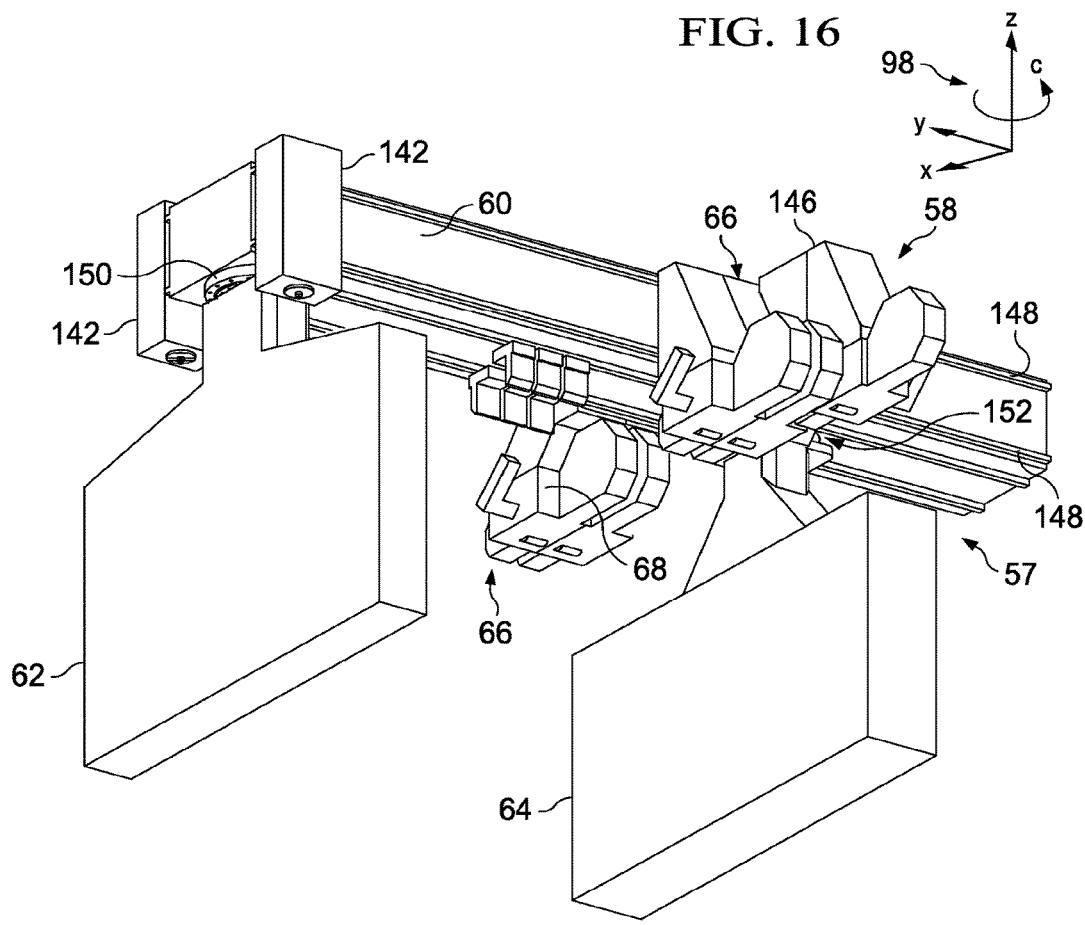
FIG. 16 is an illustration of another isometric view of the zero degree laminator shown in FIG. 15, taken from the bottom.

Attention is now directed to FIGS. 15 and 16 which illustrate additional details of the zero degree laminator 58 shown in FIGS. 1, 3 and 4. The laminator 56 includes a gantry 57 comprising a pair of supports 62, 64 respectively on opposite sides of the table 54, and a beam 60 that extends across the table 54 and is held by the support 62, 64. The beam 60 is connected to the supports 62, 64 by spaced apart pivotal bearings 150, 152 similar to the pivotal bearings 118, 120 previously discussed in connection with FIGS. 9 and 10. Although not shown in the drawings, pivotal bearing 152 may include a slide assembly similar to that used in the pivot and slide bearing 120 shown in FIG. 10 which allows the pivotal bearing 152 to slide linearly. The pivotal bearings 150, 152 allow the beam 60 to change its angular orientation relative to the X-axis 98. This change in angular orientation may be effected by moving one of the supports 62, 64 relative to the other support 62 64 along the X-axis 98. A pair of tape laminating heads 66 are mounted on rails 148 for movement along the length of the beam 66. Each of the laminating heads 66 includes a plurality of tape control modules 68 which will be described later in more detail. In other embodiments, the laminator 58 may include more than three laminating heads 66 or only a single laminating head 66.

Figure 17:
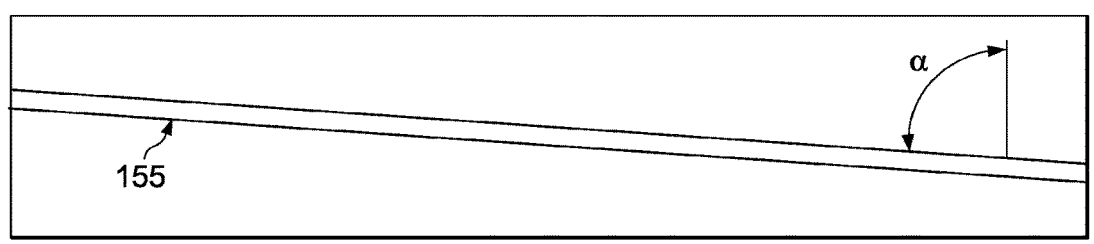
FIG. 17 is an illustration of a single tape course laid up by the zero degree laminator shown in FIGS. 15 and 16.

The tape control modules 68 may lay down continuous or discontinuous courses of composite tape in edge-to-edge relationship along the length of the part layup 52, in the direction the X-axis 98. However, as shown in FIG. 17, because the angular orientation of the beam 60 may be changed, it is possible to vary the angular orientation α of the tape courses 155 relative to the X-axis 98. In some embodiments the angular orientation of the beam 60 may be changed a relatively small amount such that the angle α of the tape courses 155 is between approximately 0 and 5 degrees. However, in other embodiments, depending on the ply schedule specified for a particular part layup 52, the beam 60 may be rotated to angular orientations such that the angle α of the tape courses 155 is greater than 5 degrees and up to approximately 45 degrees. Tape courses 155 laminated by laminator 58 along the length of the part layup 52 having orientation angles α between approximately 5 and 45 degrees may provide the part with additional cross ply stiffness that may reduce the number of cross plies required to be laminated by the non-zero degree laminator 56 and/or may improve the performance of the part. The laminator 56 may further include ultrasonic trim heads 142 for trimming layups to net-shaped parts, and in-process gap inspection apparatus 144 to measure the gaps between adjacent courses of laminated tape. Trimming the part layup to a net shape using the trim heads 142 is advantageous because it may eliminate the need for machining the part layup after it is cured, and may allow the part to be occurred, rather than co-bonded with other parts. Although not shown in the drawings, the angular orientation α of the tape courses 155 may be changed by mounting the laminations heads 66 on the beam 66 for rotation about the Z-axis 98.

Figure 18:
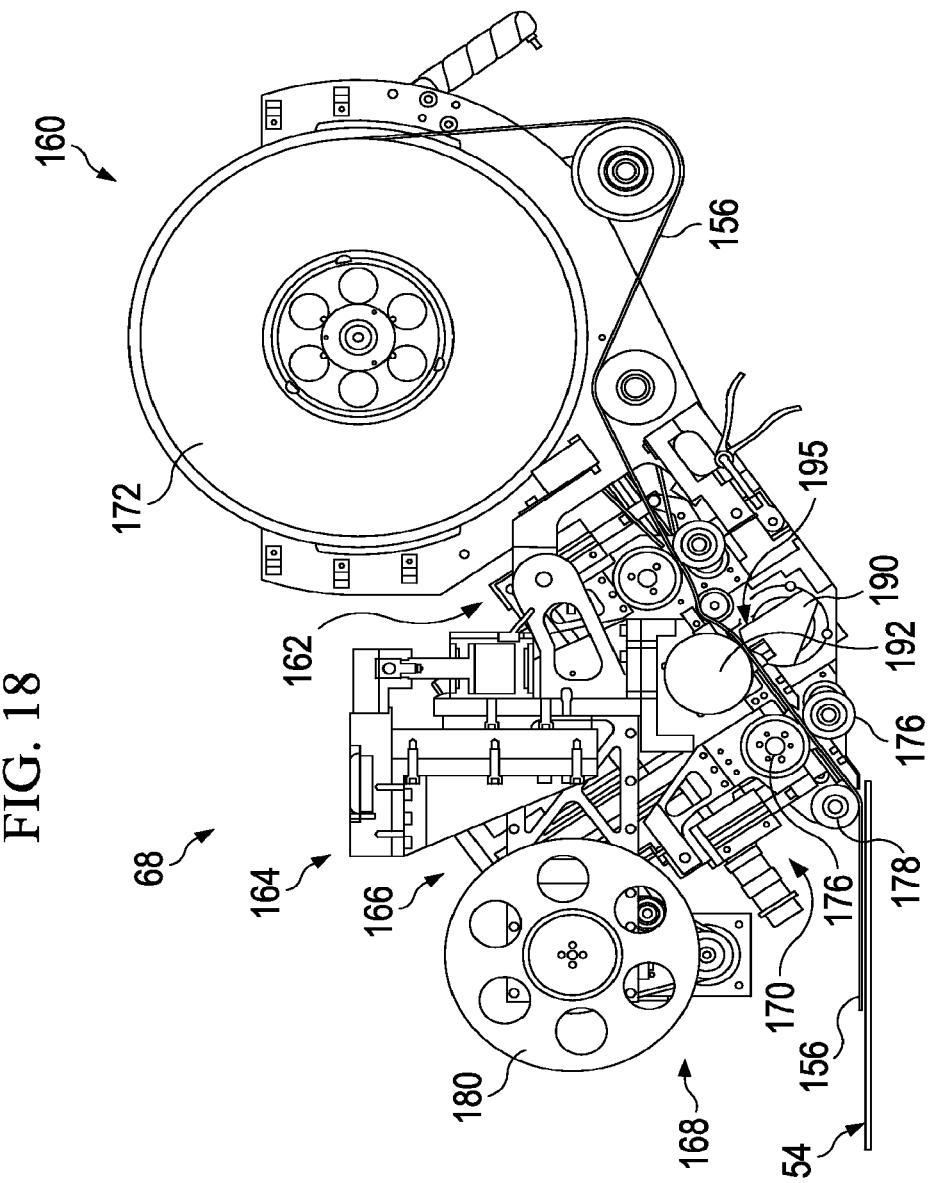
FIG. 18 is an illustration of one side of a tape control module employed in the zero degree laminator shown in FIGS. 15 and 16.
Figure 19:
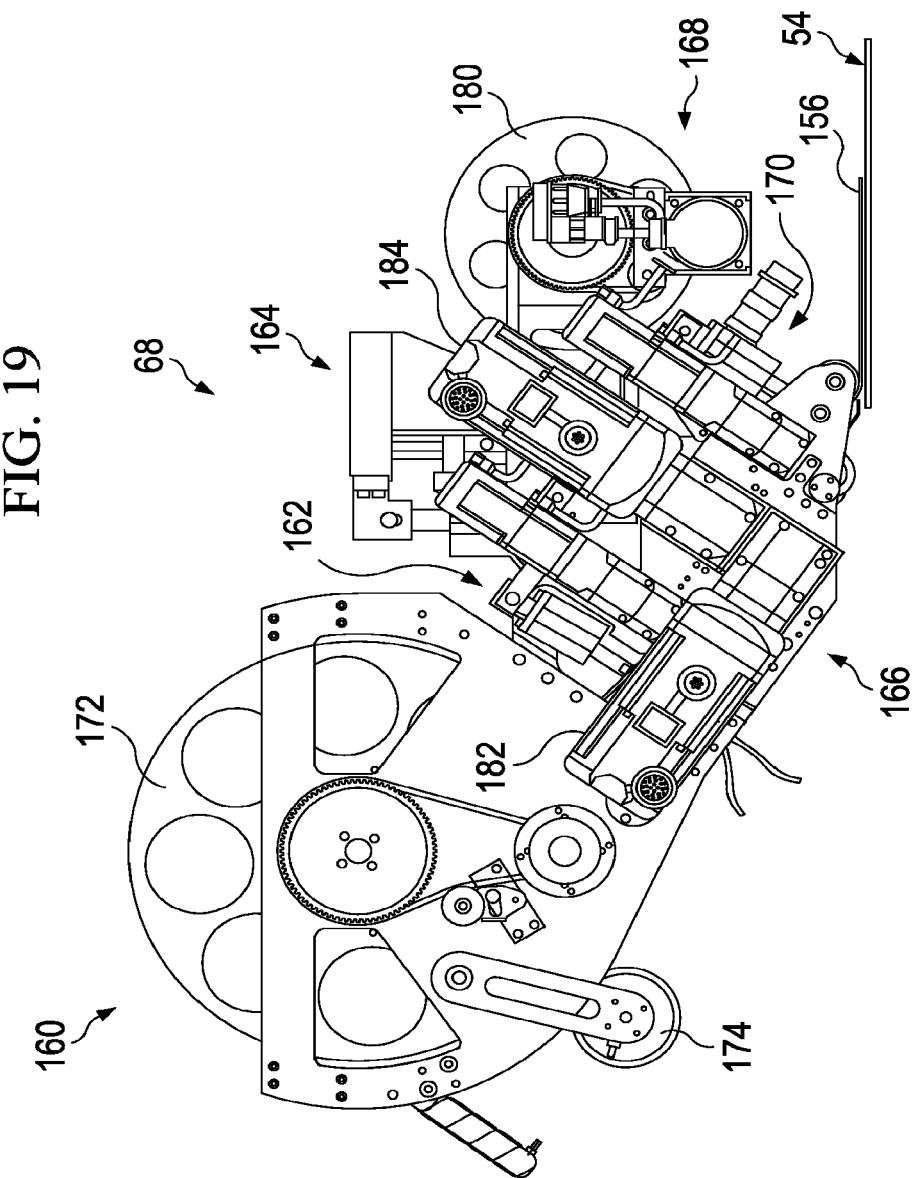
FIG. 19 is an illustration of the other side of the tape control module shown in FIG. 18.
Figure 20:
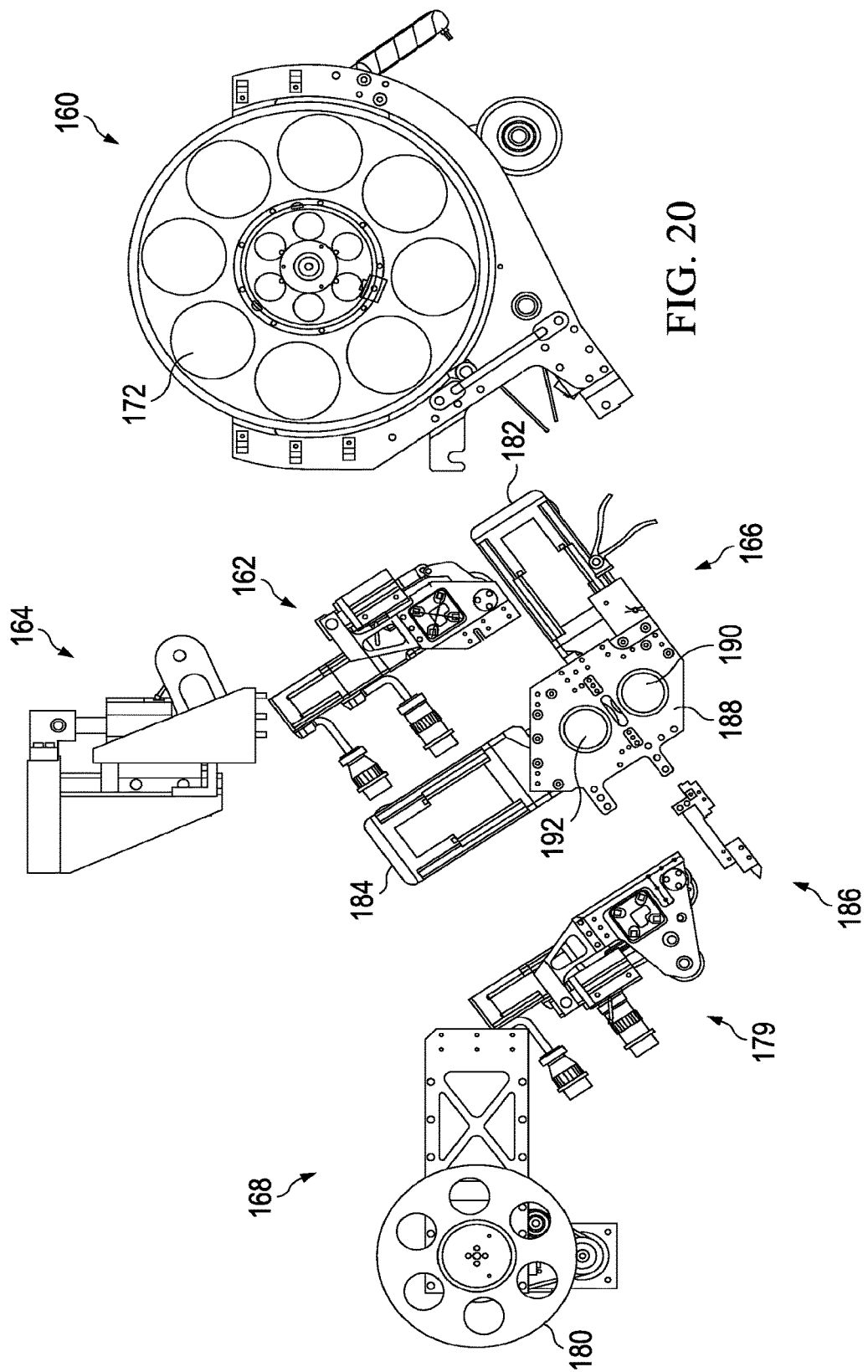
FIG. 20 is an illustration similar to FIG. 19 but exploded to show the subassemblies of the tape control module.

Attention is now directed to FIGS. 18, 19 and 20 which illustrate additional details of one of the tape control modules 68 employed in the laminator 56 shown in FIGS. 15 and 16. A tape supply assembly 160 comprises a reel 172 of unidirectional tape, and may include suitable active tension and breaking mechanisms (not shown) for tape feed. A tape feed assembly 162 draws tape from the supply assembly 160 and feeds it to a cutter assembly 166. The cutter assembly 166 includes a synchronized cutter drive system comprising a pair of synchronized servo-motors 182, 184 mounted on the housing 188. The servo-motors 182, 184 respectively drive a cutter rotor 190 and an anvil rotor 192 which are journalled for rotation in the housing 188. The cutter rotor 190 and the anvil rotor 190 together form a nip 197 (FIGS. 18 and 21) into which the tape is fed and cut between a cutter blade 200 and an anvil surface 195 on the anvil rotor 192.

An add/compact assembly 179 includes pinch rollers (FIG. 18) 176 and chutes 186 that guide tape from the reel 172 to a compaction roller 178 which compacts the cut length of tape 156 onto a substrate 54 (FIG. 18). A pickup assembly 168 picks up a paper backing (not shown) drawn away from the tape 156 prior to the tape 156 being fed to the compaction roller 178, and rolls the paper backing onto take up reel 180. An elevator assembly 164 lifts and lowers assemblies 160, 162, 179 and 186 and controls the compaction force applied to the tape 156 by the compaction roller 178.

Figure 21:
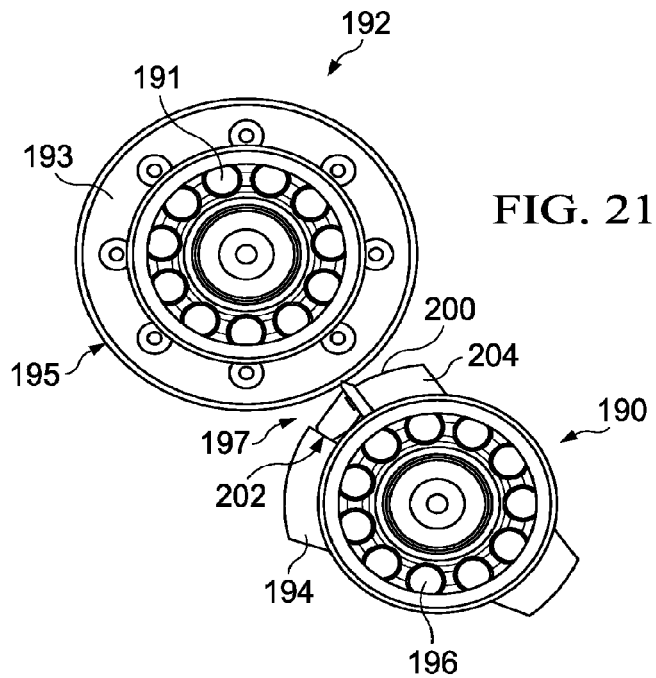
FIG. 21 is an end view of the cutter rotor and anvil rotor forming part of the tape control module shown in FIGS. 18-20.

FIG. 21 illustrates one embodiment of the cutter rotor 190 and the anvil rotor 192 employed in the tape control module 160 shown in FIGS. 18-20. The cutter rotor 190 includes an elongate cutter blade 200 mounted on a rotor body 194. A pair of bearings 196 on opposite ends of the rotor body 194 mount the roller 190 for rotation on the housing 188 shown in FIG. 20. A shaft 198 coupled with the rotor body 194 is connected with the servo motor 182. The cutter rotor 190 and the anvil rotor 192 are positioned to form a nip 197 into which the tape 156 is fed. The anvil rotor 192 includes an anvil body 193 provided with mounting bearings 191, and an outer anvil surface 195 against which the blade 200 cuts the tape 156. The servo motors 182, 184 shown in FIGS. 19 and 20 are synchronized to drive the cutter and anvil rotors 190, 192 respectively substantially at the same speed.

Figure 22:
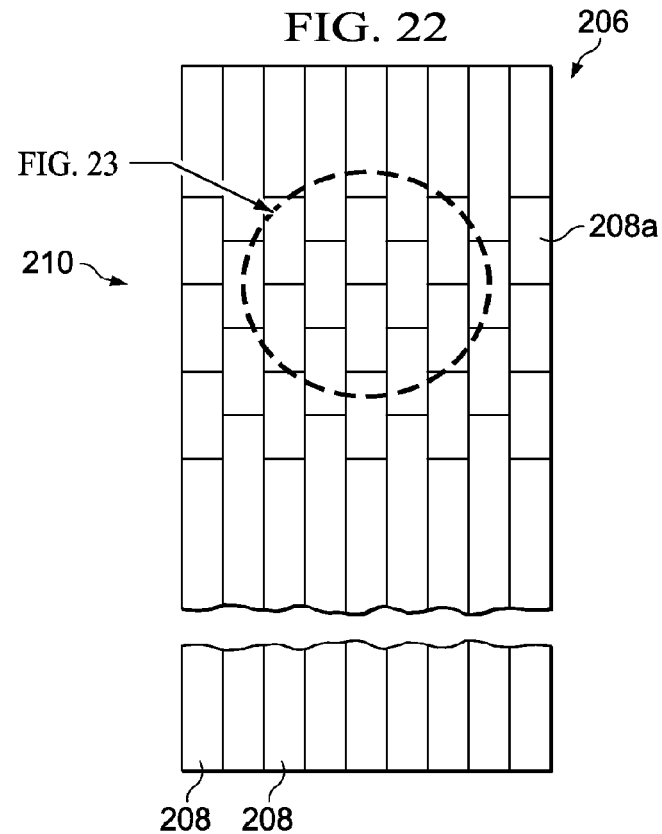
FIG. 22 is an illustration of a plan view of a ply having discontinuous tape courses laid up by the zero degree laminator shown in FIGS. 15 and 16.
Figure 23:
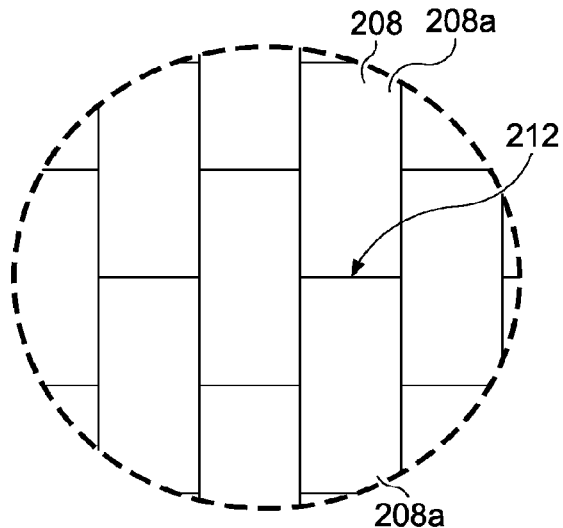
FIG. 23 is an illustration of the area designated as "FIG. 23" in FIG. 22.

FIGS. 22 and 23 illustrate a typical composite ply 206 formed of multiple, substantially parallel zero degree tape courses 208. The cutter and anvil speed synchronization described above allows tape 156 entering the cutter assembly 166 (FIG. 20) to be successively cut into short strip segments 208a laid in end-to-end abutment without substantial gaps therebetween, to form discontinuous tape courses 208. The numeral 210 indicates an area 210 of the ply 206 where each of the courses 208 is discontinuous and comprises multiple segments 208a separated by cuts 212. As best seen in FIG. 23, the abutting tape segments 208a in each course 208 are substantially contiguous to each other with little or no gaps therebetween. The use of multiple cuts in tape courses 208 with little or no gaps may aid in reducing or eliminating wrinkling of the ply 208 during forming. While only a section 210 of the ply 208 is shown as having multiple cuts 212, tape courses 208 having multiple cuts 212 may be formed in any area of the ply 206, or may extend throughout one or more, or all of the courses 208 of the ply 206.

Figure 24:
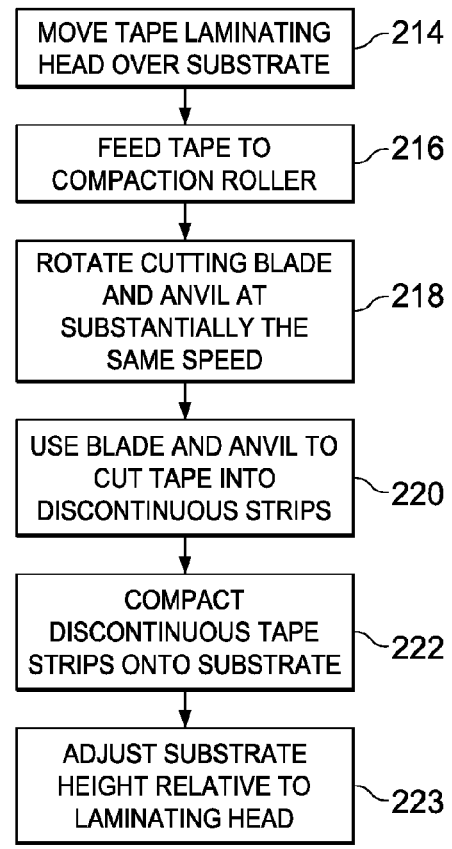
FIG. 24 is an illustration of a flow diagram of a method of laminating composites using the zero degree laminator shown in FIGS. 15 and 16.

FIG. 24 illustrates a method of laminating composite tape using the tape control module 160 shown in FIGS. 18-20. Beginning at 214, a tape laminating head 66 is moved over a substrate 54 and at 216, tape is fed to a compaction roller 178 of one or more tape control modules 160 forming part of lamination head 66. At 218, a cutting blade 200 and anvil 192 are rotated at substantially the same speed and at 220, the blade 200 and anvil 192 are used to cut tape into discontinuous strips or segments 208a. At 222, the discontinuous tape strips or segments 208a are compacted onto the substrate 54. Finally, after a ply has been laminated onto the substrate 54 in steps 214-222, the height of the substrate 54 relative to the laminating head 66, and thus the distance between them, may be adjusted along the Z-axis 98 to compensate for the thickness of the just-laid ply. This adjustment may be performed by adjusting the elevation of the table 54 show in FIGS. 3 and 4.

Figure 25:
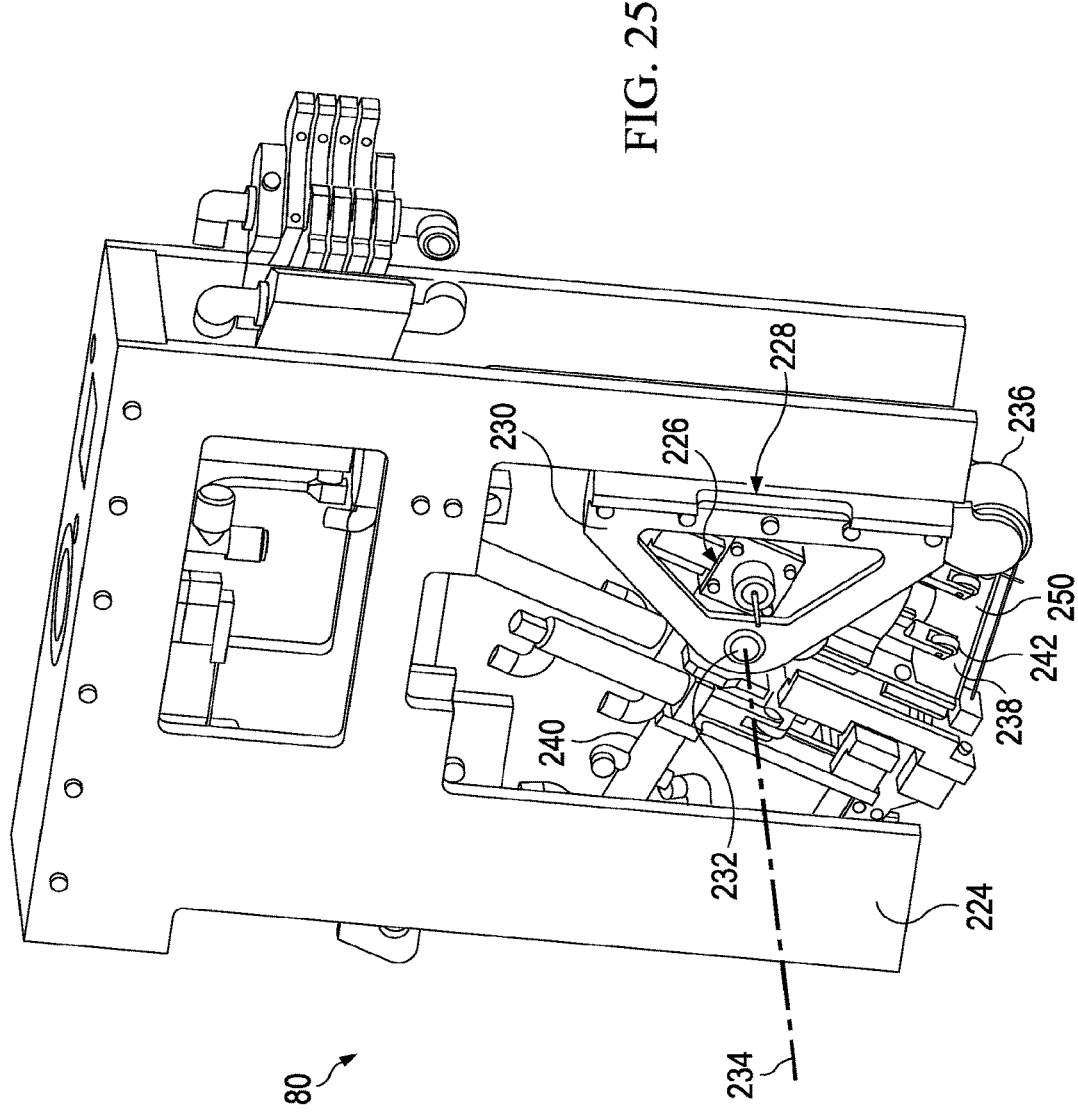
FIG. 25 is an illustration of an isometric view of a portion of one of the tape control modules used in the non-zero degree laminator shown in FIGS. 5-8.
Figure 26:
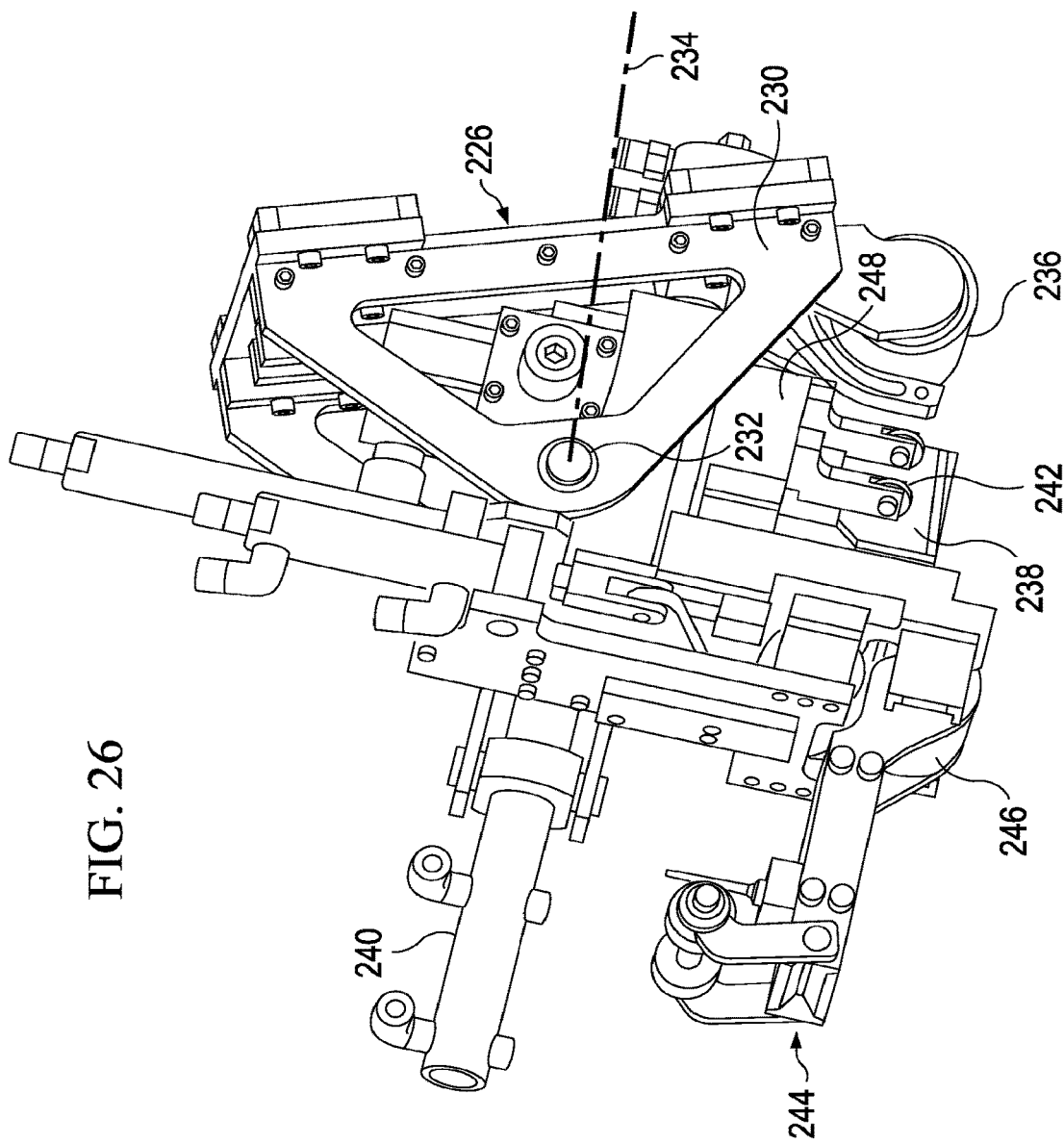
FIG. 26 is an illustration of a perspective view showing additional details of the cutter assembly forming part of the tape control module shown in FIG. 25.

Attention is now directed to FIGS. 25 and 26 which illustrate portions of one of the tape control modules 80 employed in the laminating heads 78 (FIG. 1, 5-12). A tape add/cutter assembly 226 is mounted by trunnions 232 on a subframe 230 for pivotal motion about an axis 234 extending normal to the direction of travel (not shown) of the laminating head 78. The subframe 230 is mounted for linear up and down movement on a main frame 224 by means of a slide assembly 228. The pivoting assembly 226 includes a reciprocating, guillotine type cutter blade 238 located substantially in the center of the assembly 226 that cuts tape (not shown) passing over an anvil 250. Rollers 242 hold the blade 238 in position against the anvil 250 during a tape cut. The tape/add/cutter assembly 226 positions the end of the tape consistently and accurately. As will be discussed later in more detail, the cutter blade 238 may be rotated by an actuator 240 to any of a plurality of cutting positions to make angular tape cuts, such as those previously described in connection with FIG. 13.

Referring particularly to FIG. 26, composite tape from a tape supply (not shown) on the tape control module 80 is fed through a guide 244 and across a roller 246 to the pivoting tape add/cutter assembly 226 where it is cut by the blade 238 and then compacted against a substrate (not shown) by a compaction roller 236 on the subframe 230. During a tape cut, the pivoting assembly 226 pivots about the axis 234 as the blade 238 passes through the tape and severs it against the anvil 250.

Figure 28:
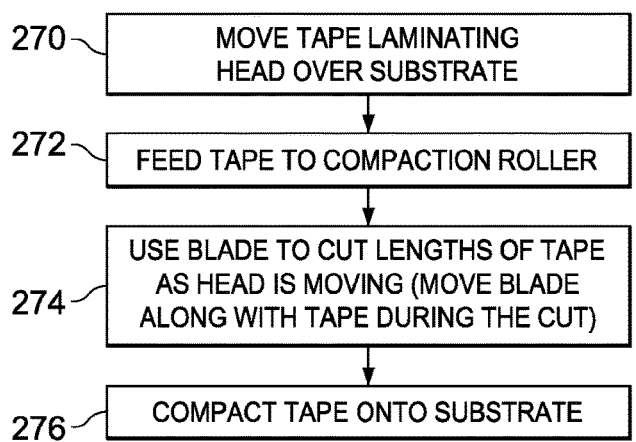
FIG. 28 is an illustration of a flow diagram of a method of laminating tape using the tape control module shown in FIG. 25.

FIG. 28 diagrammatically illustrates a tape cut made "on the fly" by the pivoting assembly 226. During the cut, the blade 238 and the anvil 250 move with each other through an arc 252, from the position shown at 256 to the position shown at 258. At 256, the blade 238 moves downwardly 254 and initially engages the tape 156. As the blade 238 and the anvil 250 continue to move along the arc 252, the blade 238 moves through the tape 156 and past the anvil 250 until the tape is severed at 258. Thus, the blade 238 moves along with the anvil 250 as well as with the tape 156 during a cut until the cut is complete. As a result of this simultaneous movement of the blade 238 and the tape 156 during a cut "on the fly", tension spikes in the tape 156 may be reduced which may aid in a smooth feed of the tape to the compaction roller 236, and reduce the possibility of tape lift from the substrate following compaction.

FIG. 28 illustrates the steps of a method of laminating composite tape onto a substrate 54 using a lamination head 78 of the type employing the pivotal cutter assembly 226 shown in FIGS. 25 and 26. Beginning at 270, the tape lamination head 78 is moved over the substrate and at 272, tape is fed to a compaction roller 236. At 274, a blade 238 is used to cut lengths of tape as the head 78 continues moving. The blade 238 is moved along with the tape during a cut. At 276, the cut length of tape is compacted onto the substrate 54.

Figure 27:
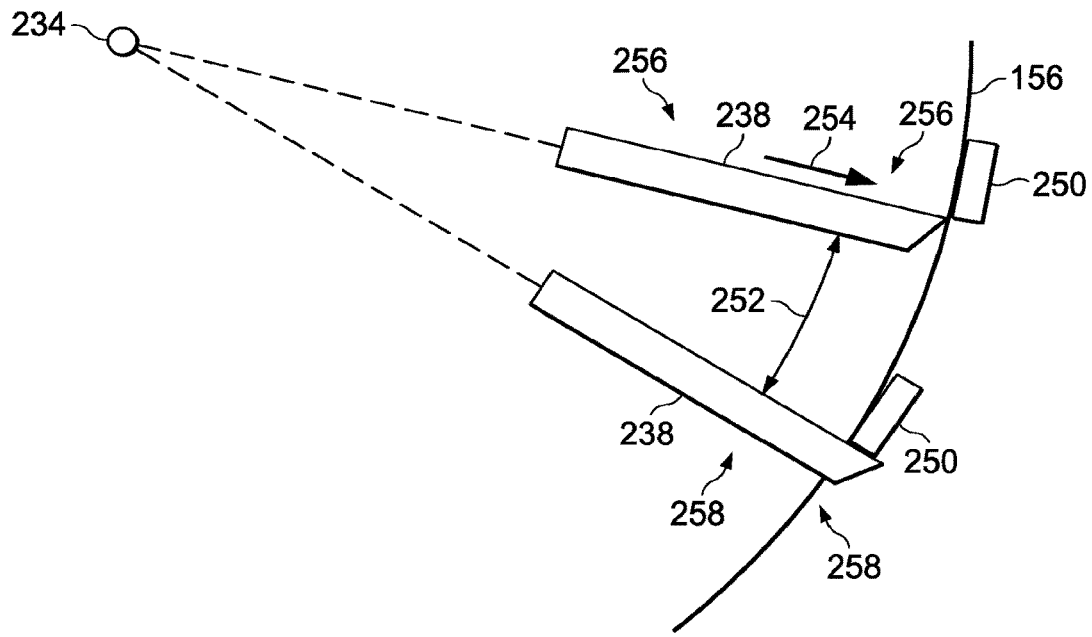
FIG. 27 is an illustration of a diagrammatic view showing the movement of the cutting blade of the cutter assembly shown in FIGS. 25 and 26, along with the tape and the anvil during a cut.
Figure 29:
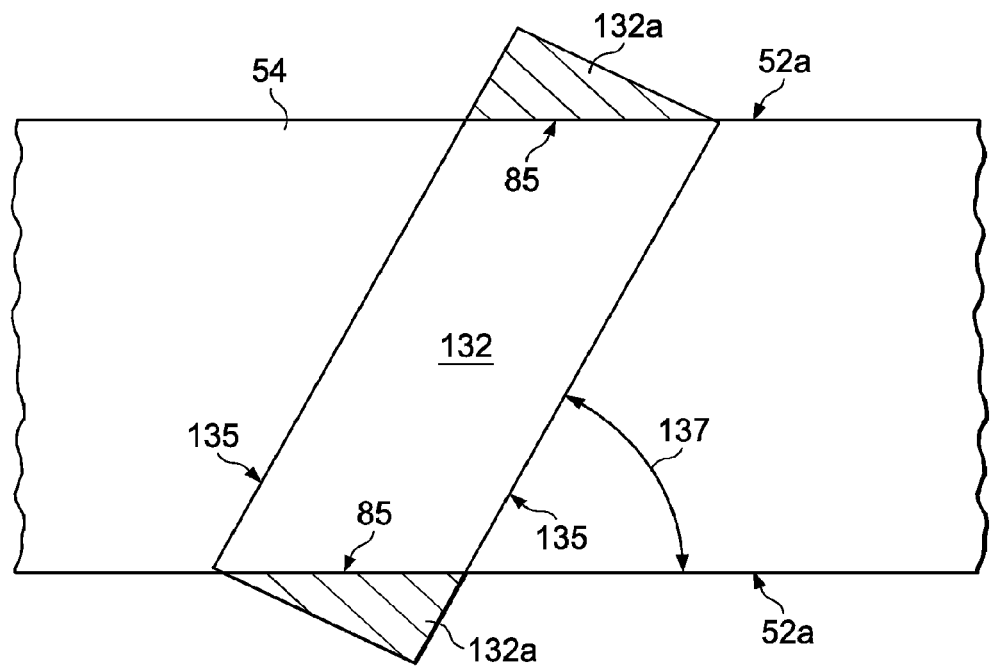
FIG. 29 is an illustration of a single 45 degree tape course cut at angles parallel to the substrate and showing areas of waste avoided by the angular cuts.

Referring now to FIG. 29, as previously discussed in connection with FIG. 13, a laminating head 78 employing tape control modules 80 of the type shown in FIGS. 26 and 27 may be employed to laminate non-zero tape courses 132 onto a substrate 54 in which the ends 85 of the tape course 132 are angularly cut, substantially parallel to the edges 52a of the substrate 52. By cutting the ends 85 of the tape 132 substantially parallel to the substrate edges 52a, rather than normal to the longitudinal edges 135 of the tape 132, an area of wasted tape indicated by the cross hatched area 132a is avoided. These angular tape cuts are accomplished by rotating the cutter blade 238 such that it is substantially parallel to the substrate edges 52a.

Figure 30:
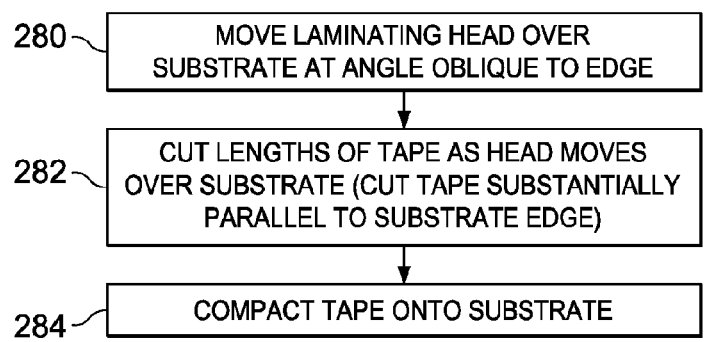
FIG. 30 is an illustration of a flow diagram of a method of laminating composite materials using tape cuts parallel to a substrate edge as shown in FIG. 29.

FIG. 30 illustrates a method of laminating non-zero tape courses onto a substrate 54 using the angular tape cuts shown in FIG. 29. Beginning at 280, a laminating head 78 is moved over a substrate 54 at an angle 137 (FIG. 29) oblique to an edge 52a of the substrate 54. At 282, lengths of the tape 132 are cut as the head 78 moves over the substrate 54; the tape 132 is cut substantially parallel to the substrate edge 32a. At 284, the cut tape 132 is compacted onto the substrate 54.

Figure 31:
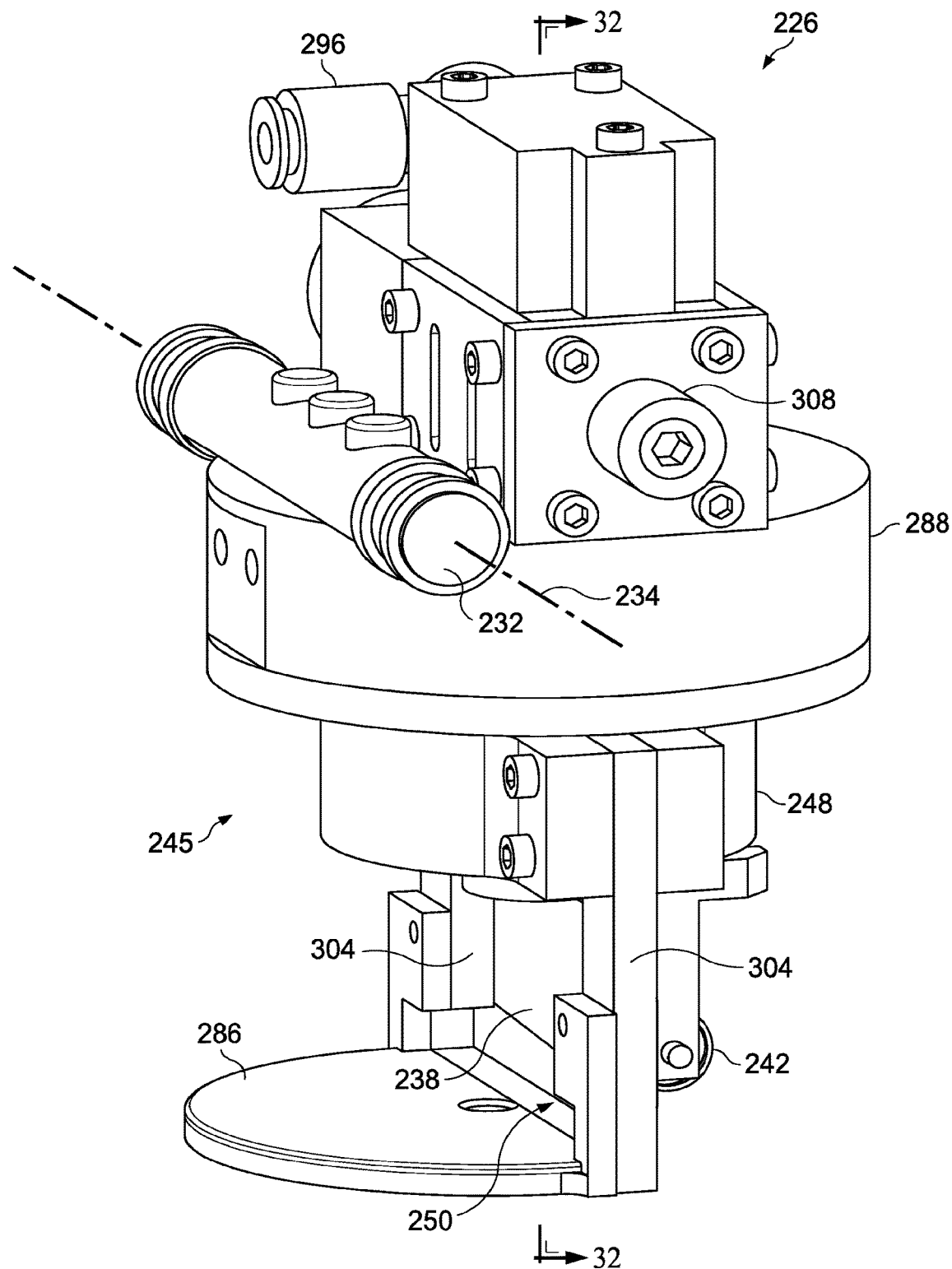
FIG. 31 is an illustration of a perspective view of a tape cutter assembly forming part of the tape control module shown in FIG. 25.
Figure 32:
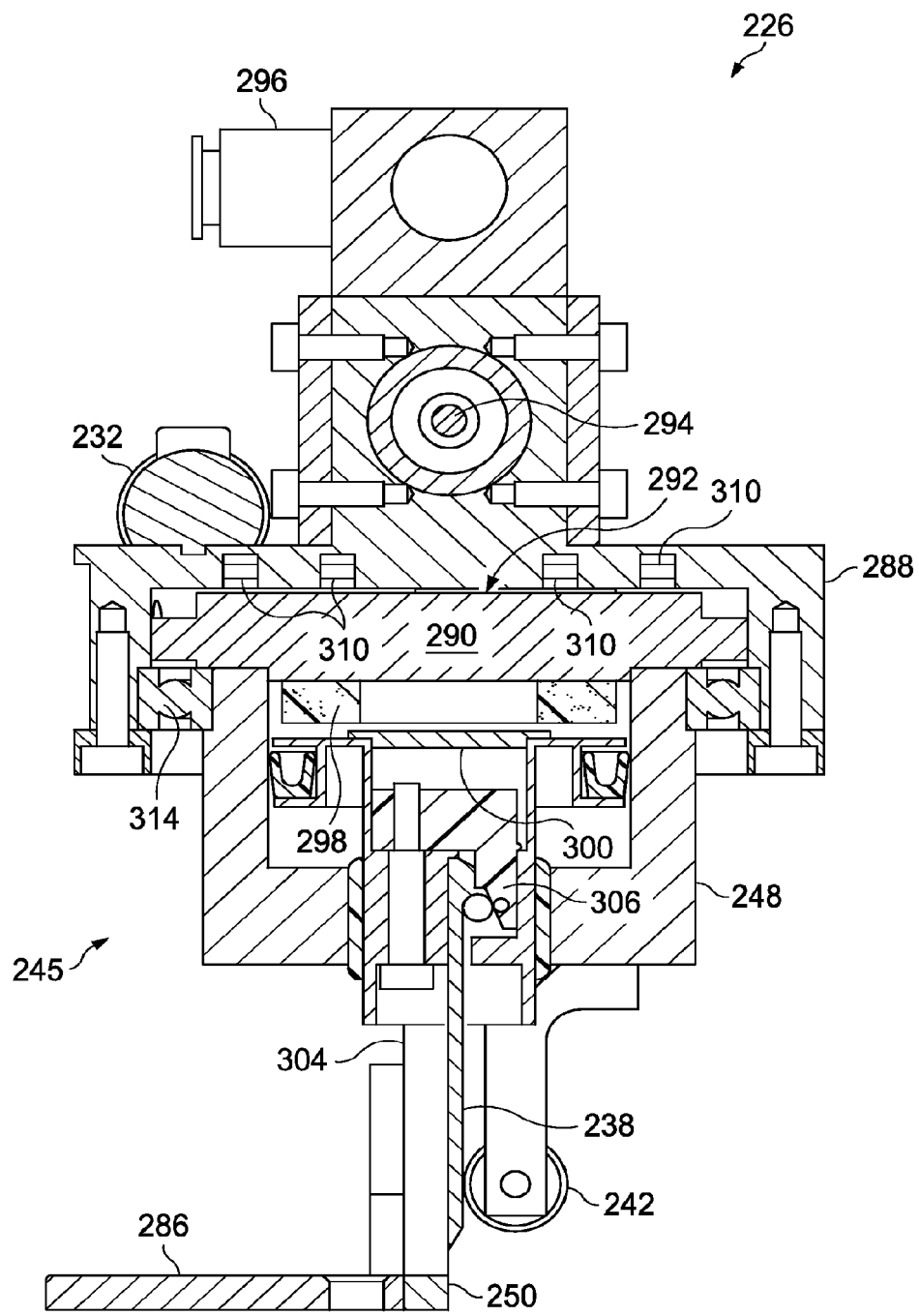
FIG. 32 is an illustration of a sectional view taken along the line 32-32 in FIG. 31.
Figure 33:
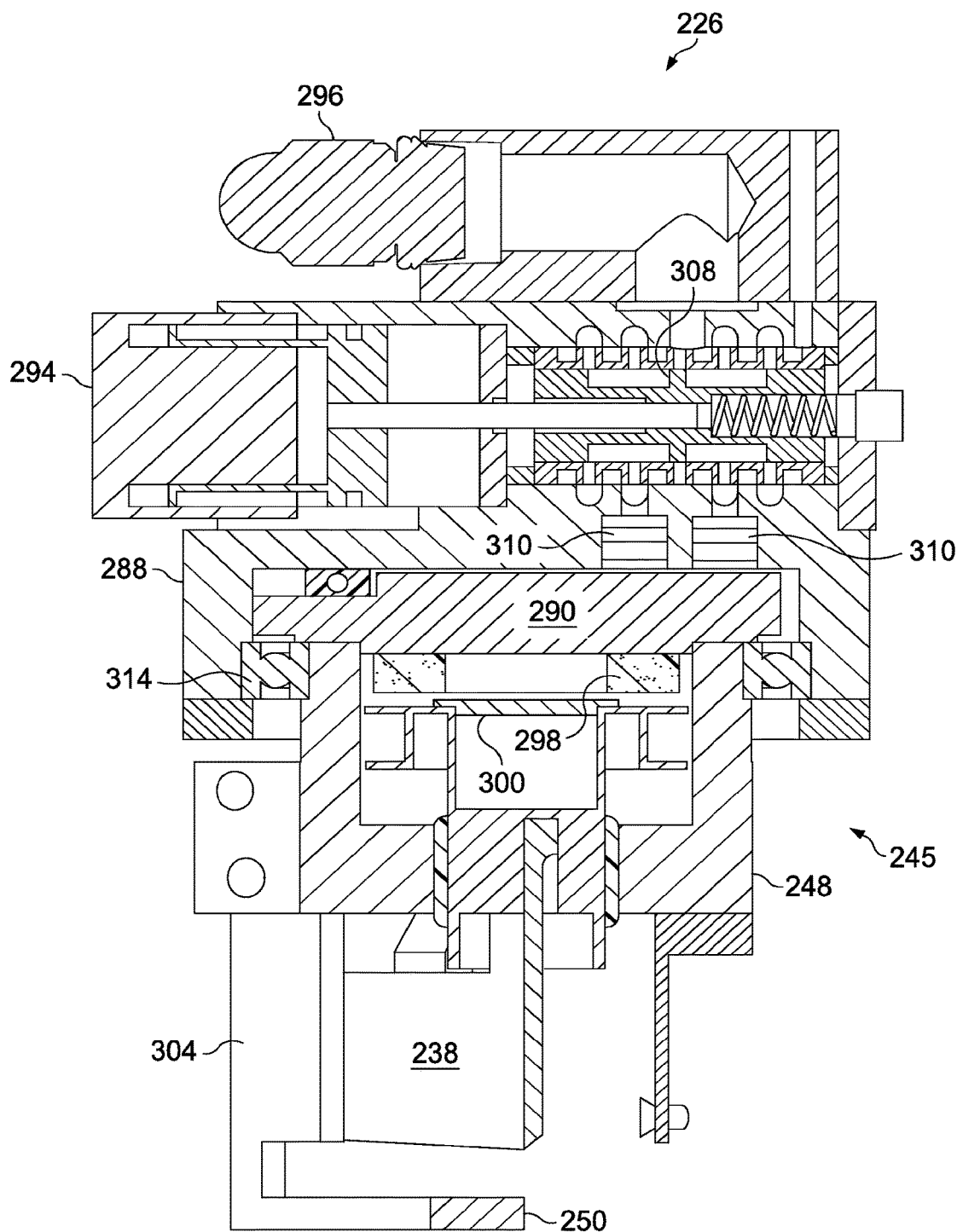
FIG. 33 is an illustration of a cross sectional view similar to FIG. 32 but showing additional details of the cutter assembly.

FIGS. 31, 32 and 33 illustrate additional details of the pivoting add/cutter assembly 226 previously discussed in connection with FIGS. 25 and 26, and particularly the features which allow angular tape cuts to be made as described above. The cutter assembly 226 includes a rotor assembly 245 comprising a cylinder 248 having a bearing 314 rotatable within a housing 288. The cylinder 248 includes a cylinder top 290 that rotates along with the cylinder 248. A piston 300 reciprocal within the cylinder 248 is secured to the upper end of the blade 238. The blade 238 may have a suitable non-stick coating (not shown) such as titanium nitride or a PVD (physical vapor deposition) to prevent the blade from sticking to the resin of the tape during cuts. The anvil 250 along with a tape support 286, are connected by an anvil arm 304 to the cylinder 248 and thus are rotatable along with the cylinder 248 within the housing 288. A blade latch 308 secures the blade 238 to the piston 300 and may be released to allow removal and replacement of the blade from the bottom of the assembly 226. A foam damper 298 may be provided between the piston 300 and the cylinder top 290 to cushion the movement of the piston 300 when it reaches its upper extremity of movement.

The piston 300, and thus the reciprocating movement of the blade 238 are driven by pressurized air that enters the cutter assembly 226 through an air inlet port 296. As best seen in FIG. 33, air entering the inlet port 296 passes through a spool valve 308 controlled by an electrical voice coil 294. Pressurized air allowed to pass through valve 308 during a cutting cycle enters valve ports 310 and cylinder top 290 into the cylinder 248. Multiple pairs of the valve ports 310 are provided which respectively connect the valve 308 with the cylinder 248, depending on the rotational position of the cylinder 248 and the blade 238. The pressurized air entering the cylinder 248 forces the piston 300 and thus the blade 238 downwardly to cut a length of tape against the anvil 250. The voice coil 294 is exceptionally fast acting and causes the spool valve 308 to be actuated and retracted at high speeds which facilitate rapid cutting strokes by the blade 238.

Figure 35:
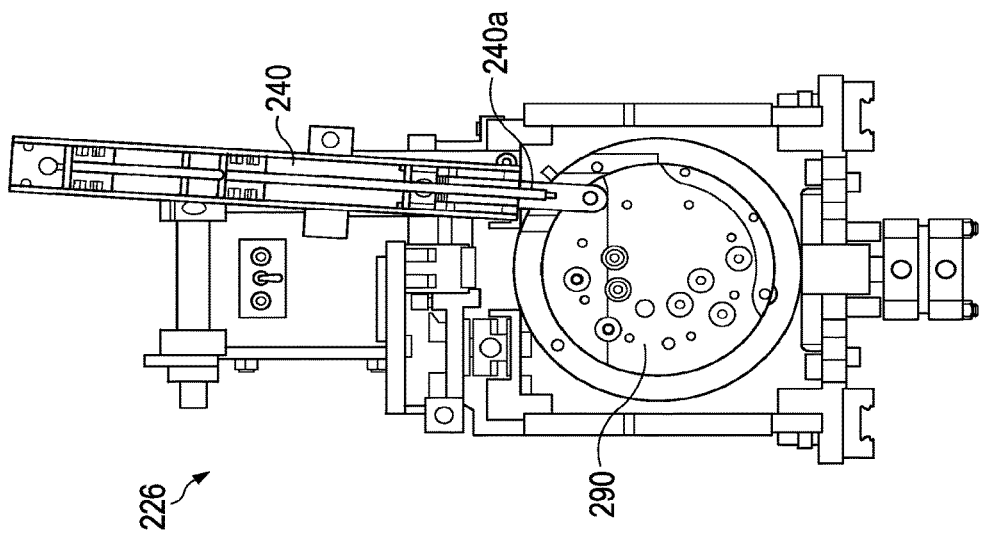
FIG. 35 is an illustration similar to FIG. 34 but showing the blade rotator actuator having been actuated to a second position.
Figure 34:
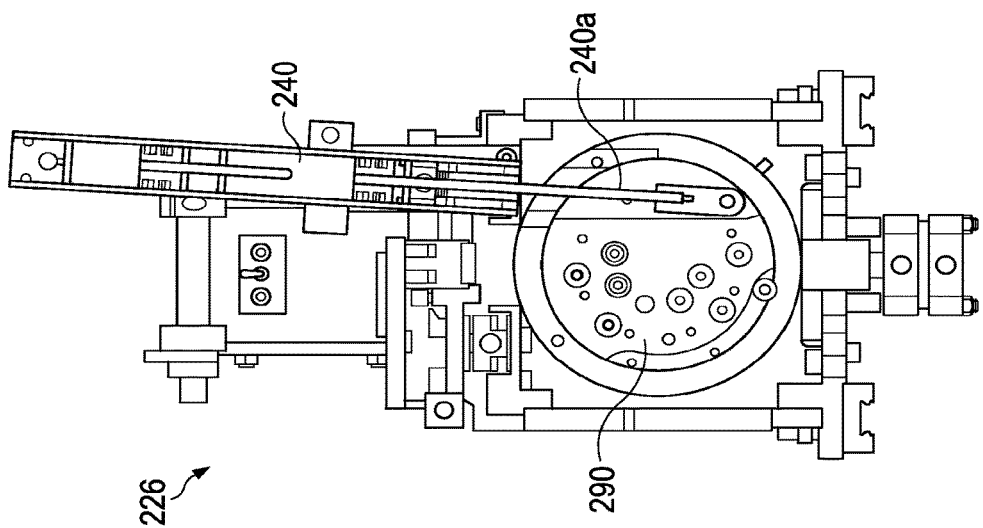
FIG. 34 is an illustration of a top view of the tape control module shown in FIG. 26, showing the blade rotator actuator in a first position.
Figure 38:
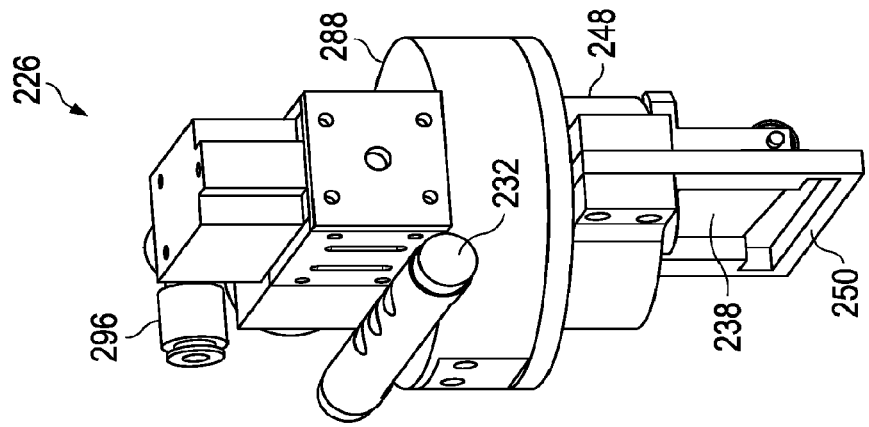
FIGS. 36-38 respectively illustrate the cutter assembly shown in FIGS. 31-33 in three differing rotational positions.
Figure 37:
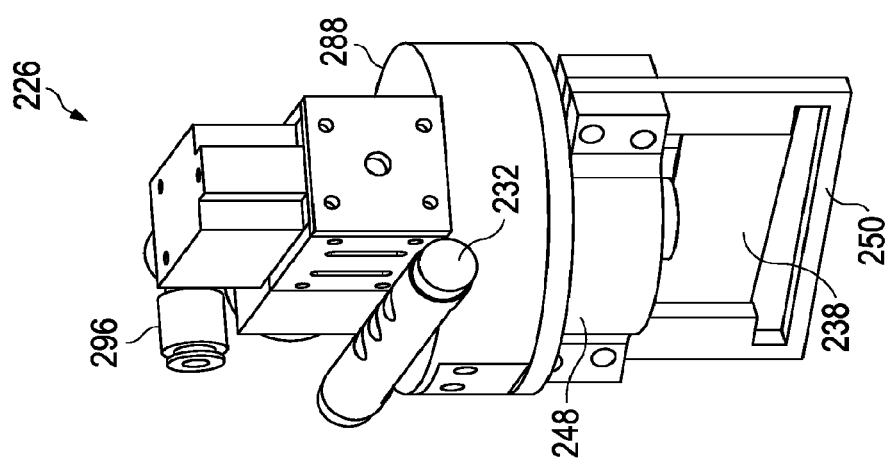
Figure 36:
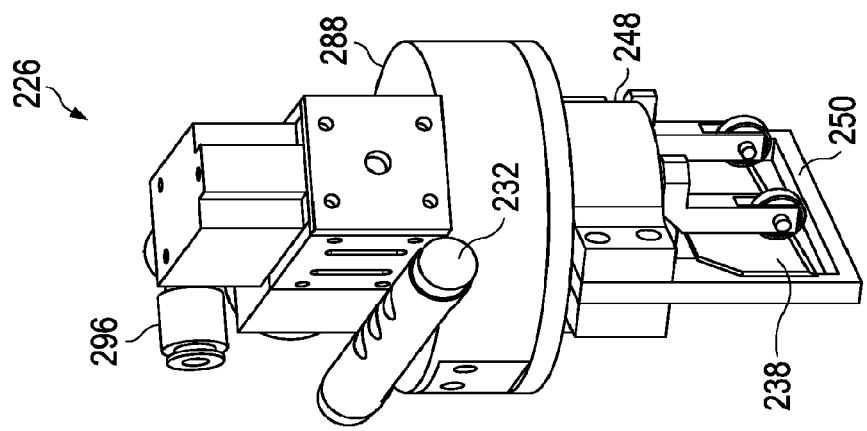

FIGS. 34 and 35 illustrate the mechanical connection between the three position linear actuator 240 shown in FIGS. 25 and 26 and the cylinder top 290. In the illustrated example the linear actuator is a pneumatically operated three position cylinder, however, other forms of actuators are possible. The three-position actuator 240 linearly displaces an output shaft 240a to any of three linear positions. The output shaft 240a is pivotally connected to the cylinder top 290 and rotates the cylinder top 290 along with the cylinder 248, blade 238 and anvil 250 to any of a desired number of rotational positions which, in the illustrated embodiment, comprise 45, 90 and 135 degree positions relative to the direction of travel of the tape control module 80. FIGS. 36, 37 and 38 respectively illustrate rotation of the blade 238 to the 45, 135 and 90 degree cutting positions.

Figure 39:
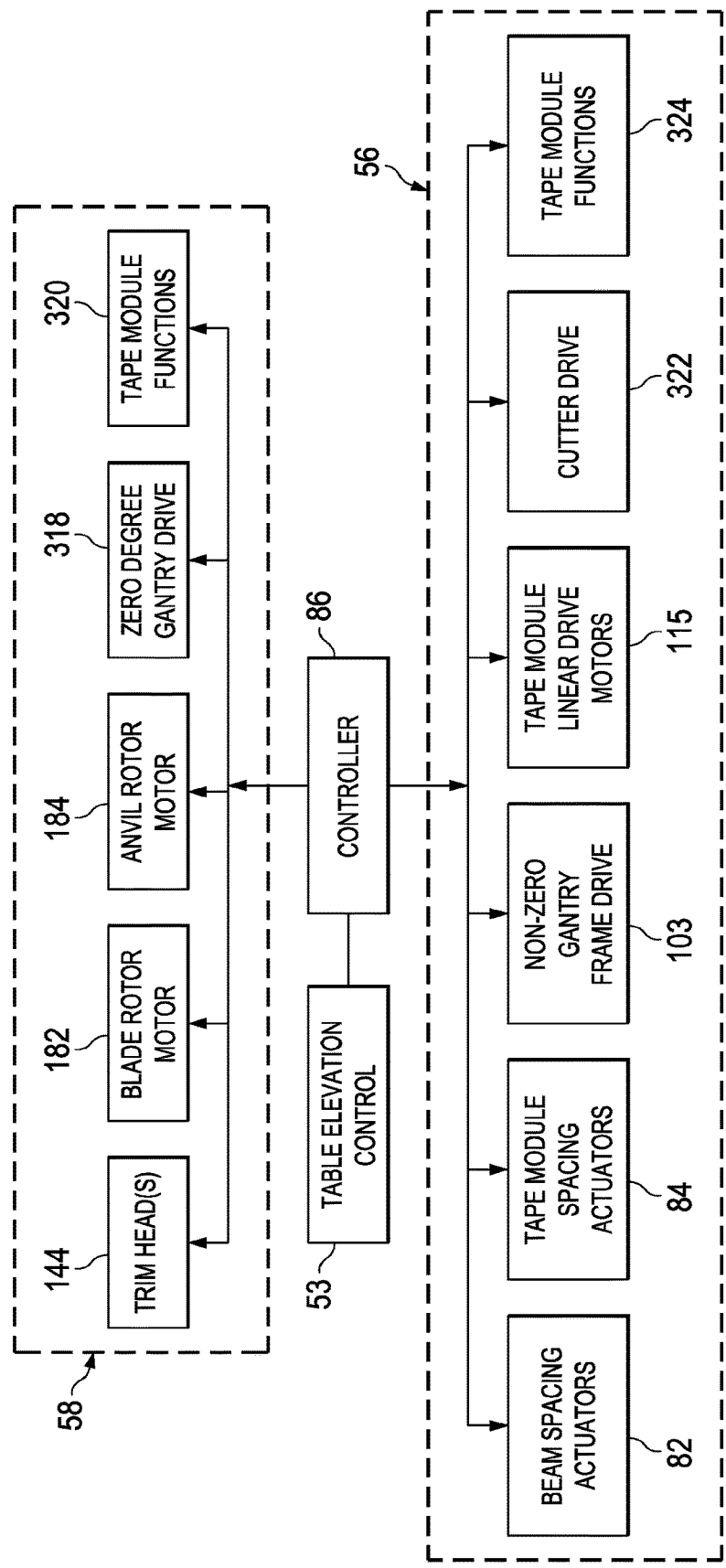
FIG. 39 is an illustration of a block diagram of the basic electrical and pneumatic components of the apparatus shown in FIGS. 1 and 3.

FIG. 39 is a functional block diagram showing the control components of the apparatus 50. As previously indicated, the controller 86 may comprise a PC, PLC or other electronic controller device and functions to control a series of pneumatic and electrical controls on each of the laminators 56, 58, and the table elevation control 53. Elements of the first laminator 56 controlled by the controller 86 include the cutter drive 322, tape control module functions 324, tape control module linear motors 115, beam spacing and tape control module spacing actuators 82, 84 respectively, and the gantry drive motors 102. The controller 86 operates the gantry frame drive 102 to incrementally advance the gantry 59 and thus the ganged beams 76, to the next laminating position, as described in connection with FIG. 13. When the gantry frame drive 102 alters the laminating angle of the beams 76 by displacing the frame supports 72, 74 relative to each other, the controller 86 sends control signals to the tape control module linear drive motors 115 which realigns the modules 80 relative to each other along the beams 76, such that the modules 80 may simultaneously begin laying tape along a starting edge of the substrate 54 (e.g. edge 52a in FIG. 13).

In the case of laminator 58, the controller 86 controls the gantry movement drive 318, blade rotor motor 182, anvil rotor motor 184 and tape module control functions 320 which include, for example, without limitation, tape add and cut functions as well as compaction pressure. The controller 86 may also control the operation of a one or more trim heads 53 on the laminator 58 which may be used to cut the part layup 52 to a net shape. The speeds of the servomotors 182, 184 are synchronized by the controller 86, as previously discussed. The gantry drive 318 may include, for example and without limitation, wheel motors (not shown) which drive the gantry 57 (FIGS. 15 and 16) along the length of the table 54, as well as motors (not shown) that drive the laminating heads 66 across the gantry beam 60.

Embodiments of the disclosure may find use in a variety of potential applications, particularly in the transportation industry, including for example, aerospace, marine, automotive applications and other application where automated layup equipment may be used. Thus, referring now to FIGS. 40 and 41, embodiments of the disclosure may be used in the context of an aircraft manufacturing and service method 326 as shown in FIG. 40 and an aircraft 328 as shown in FIG. 41. Aircraft applications of the disclosed embodiments may include, for example, without limitation, layup of stiffener members such as, without limitation spars and stringers. During pre-production, exemplary method 326 may include specification and design 330 of the aircraft 328 and material procurement 332. During production, component and subassembly manufacturing 334 and system integration 336 of the aircraft 328 takes place. Thereafter, the aircraft 328 may go through certification and delivery 338 in order to be placed in service 340. While in service by a customer, the aircraft 328 is scheduled for routine maintenance and service 342, which may also include modification, reconfiguration, refurbishment, and so on.

Each of the processes of method 326 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 41, the aircraft 328 produced by exemplary method 326 may include an airframe 344 with a plurality of systems 346 and an interior 348. Examples of high-level systems 346 include one or more of a propulsion system 350, an electrical system 352, a hydraulic system 354, and an environmental system 356. Any number of other systems may be included. Although an aerospace example is shown, the principles of the disclosure may be applied to other industries, such as the marine and automotive industries.

Systems and methods embodied herein may be employed during any one or more of the stages of the production and service method 326. For example, components or subassemblies corresponding to production process 334 may be fabricated or manufactured in a manner similar to components or subassemblies produced while the aircraft 328 is in service. Also, one or more apparatus embodiments, method embodiments, or a combination thereof may be utilized during the production stages 334 and 336, for example, by substantially expediting assembly of or reducing the cost of an aircraft 328. Similarly, one or more of apparatus embodiments, method embodiments, or a combination thereof may be utilized while the aircraft 138 is in service, for example and without limitation, to maintenance and service 342.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite tape laminating head, comprising;
a supply of composite tape;
a compaction roller adapted to compact the tape onto a substrate;
a tape feed assembly for feeding tape from the tape supply to the compaction roller; and
a cutter assembly including a reciprocating cutter blade for cutting the tape fed to the compaction roller, the cutter assembly further including a rotator assembly for rotating the cutter blade to any of a plurality of cutting angles, wherein the cutter blade is pivotable along an arc during a cut, wherein the tape cutting assembly further includes an anvil against which the cutter blade cuts the tape, and wherein the anvil is pivotable along the arc with the blade;
a first servo motor connected to the cutter blade and configured to move the cutter blade; and
a second servo motor connected to the anvil and configured to move the anvil, wherein:
the first servo motor is configured to move the cutter blade at a same speed as movement of the composite tape during operation of the composite tape laminating head; and
the second servo motor is configured to move the anvil at a same speed as movement of the composite tape during operation of the composite tape laminating head.

2. The composite tape laminating head of claim 1, wherein the rotator assembly includes:
a housing,
a cylinder rotatably mounted on the housing, and
a piston coupled with the cutter blade and reciprocal within the cylinder.

3. The composite tape laminating head of claim 2, wherein:
the rotator assembly includes an actuator coupled with the cylinder for rotating the cylinder to any of a plurality of rotational positions.

4. The composite tape laminating head of claim 2, wherein the cutter assembly further includes:
a valve adapted to be coupled with a pressurized air source, and
an electrical voice coil for operating the valve.

5. A composite tape laminating head, comprising:
a compaction roller adapted to compact a supply of composite tape onto a substrate;
a tape feed assembly for feeding the composite tape from the supply to the compaction roller; and
a tape cutting assembly for cutting the tape, including a cutting blade movable along with the tape as the tape is being cut, wherein the cutting blade is pivotable along an arc during a cut, wherein the tape cutting assembly further includes an anvil against which the cutting blade cuts the tape, and wherein the anvil is pivotable along the arc with the cutting blade
a first servo motor connected to the cutting blade and configured to move the cutting blade; and
a second servo motor connected to the anvil and configured to move the anvil, wherein:
the first servo motor is configured to move the cutter blade at a same speed as movement of the composite tape during operation of the composite tape laminating head; and
the second servo motor is configured to move the anvil at a same speed as movement of the composite tape during operation of the composite tape laminating head.

6. The composite tape laminating head of claim 5, wherein the tape cutting assembly includes:
trunnions for pivotally mounting the blade on the head.

7. The composite tape laminating head of claim 5, further comprising:
a frame, and
wherein the tape cutting assembly is pivotally mounted on the frame.

8. The composite tape laminating head of claim 5, wherein the tape cutting assembly is rotatable to any of a plurality of cutting angles on the head.

9. A composite tape laminating head, comprising:
a supply of composite tape;
a compaction roller adapted to compact the tape onto a substrate;
a tape feed assembly for feeding tape from the tape supply to the compaction roller;
a tape cutting assembly for cutting the tape, including a movable cutting blade and a movable anvil against which the blade cuts the tape; and
a drive system for moving the blade and the anvil in an arc in synchronism with each other, the drive system comprising:
a first servo motor connected to move the movable cutting blade and configured to move the cutting blade; and
a second servo motor connected to move the movable anvil and configured to move the anvil, wherein:
the first servo motor is configured to move the movable cutter blade at a same speed as movement of the composite tape during operation of the composite tape laminating head; and
the second servo motor is configured to move the movable anvil at a same speed as movement of the composite tape during operation of the composite tape laminating head.

10. The composite tape laminating head of claim 9, wherein the blade and the anvil are each rotatable.

11. The composite tape laminating head of claim 9, wherein the drive system includes a pair of motors for respectively rotating the blade and the anvil.

12. The composite tape laminating head of claim 9, wherein the motors are synchronized to respectively rotate the blade and the anvil at substantially the same rotational speeds.

13. The composite tape laminating head of claim 9, wherein the tape cutting assembly includes:

a housing; and a first rotor having the blade secured thereto and a second rotor having the anvil secured thereto, wherein the first rotor and the second rotor are each journalled for rotation on the housing.

14. Apparatus for laminating composite tape on a substrate having a length and a width, comprising:

- at least a first laminator movable along the length of the substrate, the first laminator including a pair of movable supports and a beam extending across the width of the substrate and coupled with each of the supports;
- a first laminating head mounted on and movable along the beam for laminating composite tape on the substrate, the first laminating head including—
- a supply of composite tape,
- a compaction roller for compacting tape onto the substrate,
- a tape feed assembly for feeding tape from the tape supply to the compaction roller, and
- a tape cutting assembly for cutting lengths of the tape fed to the compaction roller, the tape cutting assembly including a cutting blade mounted for movement in an arc along with the tape and rotatable to any of a plurality of cutting angle positions;
- a first servo motor connected to the cutting blade and configured to move the cutting blade; and
- a second servo motor connected to an anvil and configured to move the anvil, wherein:
- the first servo motor is configured to move a cutter blade at a same speed as movement of the composite tape during operation of the composite tape laminating head; and
- the second servo motor is configured to move the anvil at a same speed as movement of the composite tape during operation of the composite tape laminating head.

15. The apparatus of claim 14, further comprising pivotal connections between the beam and the supports allowing changes in a angular orientation of the beam.

16. The apparatus of claim 15, wherein:
- the first laminating head laminates composite tape across the width of the substrate; and
- the supports are movable relative to each other along the length of the substrate.

17. The apparatus of claim 14, wherein the tape cutting assembly includes an anvil movable through the arc along with the tape and the cutting blade during a tape cut, the anvil and the cutting blade moving in synchronization.

18. The apparatus of claim 14, further comprising:
- a second laminator movable along the length of the substrate, the second laminator including a beam extending across the width of the substrate; and,
- a second laminating head mounted on the beam of the second laminator for laminating composite tape on the substrate along the length of the substrate, the second laminating head including—
- a supply of composite tape,
- a compaction roller for compacting tape onto the substrate,
- a tape feed assembly from feeding tape from the tape supply to the compaction roller, and
- a tape cutting assembly for cutting lengths of the tape fed to the compaction roller.

19. The apparatus of claim 14, wherein the tape cutting assembly on the second laminating head includes a rotating cutter blade, a rotating anvil and a pair of motors synchronized with each other for respectively rotating the blade and the anvil at substantially the same rotational speed.

* * * * *